US007713338B2

(12) United States Patent
Matsuura

(10) Patent No.: US 7,713,338 B2
(45) Date of Patent: May 11, 2010

(54) METHOD AND APPARATUS FOR SEPARATING A LIQUID

(75) Inventor: Kazuo Matsuura, Naruto (JP)

(73) Assignee: Ultrasound Brewery, Tokushima (JP)

( * ) Notice: Subject to any disclaimer, the term of this patent is extended or adjusted under 35 U.S.C. 154(b) by 1274 days.

(21) Appl. No.: 11/198,130

(22) Filed: Aug. 8, 2005

(65) Prior Publication Data

US 2006/0032935 A1 Feb. 16, 2006

(30) Foreign Application Priority Data

Aug. 11, 2004 (JP) ............................ 2004-234904

(51) Int. Cl.

*B01D 3/00* (2006.01)
*B01D 51/02* (2006.01)
*B05B 17/06* (2006.01)
*C12G 3/12* (2006.01)

(52) U.S. Cl. ............................ 96/389; 96/270; 96/271; 96/273; 96/355; 210/243; 261/78.2; 261/DIG. 48

(58) Field of Classification Search ................ 261/78.2, 261/DIG. 48; 239/102.2; 210/748, 243; 96/270, 271, 273, 355, 389; 95/73, 149
See application file for complete search history.

(56) References Cited

U.S. PATENT DOCUMENTS 3,392,916 A * 7/1968 Engstrom et al. ........ 239/102.2
4,732,322 A * 3/1988 Gaysert et al. ........... 239/102.2
5,922,247 A * 7/1999 Shoham et al. ............... 96/389
7,347,889 B2 * 3/2008 Matsuura et al. .............. 96/270

FOREIGN PATENT DOCUMENTS

JP 07185203 A * 7/1995
JP 2001-314724 11/2001

* cited by examiner

*Primary Examiner*—David A Reifsnyder
(74) *Attorney, Agent, or Firm*—Wenderoth, Lind & Ponack, L.L.P.

(57) ABSTRACT

A method of separating a liquid atomizes a mixed liquid containing a plurality of components into an atomized fine particle by an ultrasonic vibration to obtain a mixed fluid of the atomized fine particle and air, separates the air from the mixed fluid and collects an atomized component, and separates the atomized component into liquids having different component contents. The method of separating a liquid atomizes the liquid while supplying a carrier gas heated with the thermal energy of the outside air to the surface of the liquid to be atomized or supplies the outside air to the surface of the liquid to be atomized, thereby atomizing the liquid while supplying the thermal energy of the outside air to the surface of the liquid.

16 Claims, 22 Drawing Sheets

METHOD AND APPARATUS FOR SEPARATING A LIQUID

BACKGROUND OF THE INVENTION

1. Field of the Invention

The present invention relates to a method and apparatus for separating a mixed liquid containing a plurality of liquids having different components from each other into liquids having different component contents from each other, for example.

2. Description of the Related Art

The present inventor has developed an apparatus for separating a mixed liquid in which a plurality of liquids having different components are mixed into liquids having different component contents from each other (see Japanese Unexamined Patent Publication (KOKAI) No. 2001-314724).

In the separating apparatus, an atomizing chamber having a closed structure is filled with an alcohol solution, the alcohol solution in the atomizing chamber is ultrasonically vibrated by an ultrasonic vibrator and is thus atomized into a mist, the mist thus atomized is coagulated and collected to separate the alcohol solution having a high concentration, and air separated from the alcohol solution is circulated in the atomizing chamber. The separating apparatus can separate the alcohol having a high concentration by the following operation.

Alcohol having such physical properties as to give a surface excess by a quick migration to the surface has a high surface concentration. When the ultrasonic vibration is carried out in this condition, the solution on the surface is changed into a mist in the air by the energy of the ultrasonic vibration and the mist is discharged as fine particles. The mist discharged into the air has a high alcohol concentration. The reason is that the solution on the surface having the high alcohol concentration is changed into the mist. When the mist is coagulated and collected, accordingly, the alcohol solution having a high concentration is separated. By this method, it is possible to separate the alcohol solution having a high concentration without heating the solution. Therefore, it is possible to separate an alcohol substance having a high concentration. Moreover, there is also a feature that the separation can be carried out without the alteration of the alcohol because of no heating.

In the apparatus described above, as compared with a method of vaporizing and separating a liquid as in distillation, energy to be consumed for the separation can be lessened more greatly. The reason is that it is not necessary to apply high vaporization heat to the liquid to be vaporized. The ultrasonic vibration atomizes the liquid into atomized fine particles at a temperature which is equal to or lower than a boiling point. The atomized fine particle has a component content which is different from a liquid which is not atomized. Therefore, it is possible to separate and collect the atomized fine particle from the air, thereby carrying out a separation into a liquid having a different component content.

Referring to the separation to be carried out by the ultrasonic vibration described above, it is not necessary to heat the liquid to be the boiling point or more. Therefore, it is possible to lessen a thermal energy to be consumed. If the temperature of the air at which the liquid is atomized into the atomized fine particle is low, however, an atomization efficiency is reduced. By heating the air to be supplied to the atomizing chamber, it is possible to increase the atomization efficiency. When the temperature of the air is raised, the thermal energy is consumed for the heating. For this reason, it is impossible to efficiently separate the mixed liquid in a small energy consumption.

The present invention has been developed in order to solve the aforementioned conventional drawbacks. An important object of the present invention is to provide a separating method and apparatus capable of reducing an energy consumption to efficiently generate an atomized fine particle, thereby efficiently separating a mixed liquid.

SUMMARY OF THE INVENTION

In a method of separating a liquid according to the present invention, a mixed liquid containing a plurality of components is atomized into an atomized fine particle by an ultrasonic vibration to obtain a mixed fluid of the atomized fine particle and air, the air is separated from the mixed fluid to collect an atomized component, thus the atomized component is separated into liquids having different component contents. This method of separating a liquid atomizes the liquid by supplying a carrier gas heated with a thermal energy of outside air to a surface of the liquid to be atomized.

In the method of separating a liquid according to the present invention, the carrier gas can contain the air separated from the mixed fluid. In the method of separating a liquid according to the present invention, furthermore, the carrier gas can contain the air separated from the mixed fluid by an air separating machine 50.

In a method of separating a liquid according to the present invention, a mixed liquid containing a plurality of components is atomized into an atomized fine particle by an ultrasonic vibration to obtain a mixed fluid of the atomized fine particle and air, the air is separated from the mixed fluid to collect an atomized component, and the atomized component is separated into liquids having different component contents. The method of separating a liquid supplies the outside air to the surface of the liquid to be atomized and atomizes the liquid while supplying a thermal energy of outside air to the surface of the liquid.

In the method of separating a liquid according to the present invention, the mixed liquid to be separated can be any of a crude oil, petroleum, a volatile oil, a light oil, gasoline, naphtha, kerosene, a heavy oil, a substance obtained by carrying out a cracking treatment over them with a catalyst, and their mixture. In the method of separating a liquid according to the present invention, moreover, the mixed liquid can be separated into hydrocarbon mixtures having different numbers of carbons (n). In the method of separating a liquid according to the present invention, furthermore, the mixed liquid can contain alcohols and water.

An apparatus for separating a liquid according to the present invention comprises an atomizing device 100 for ultrasonically vibrating a mixed liquid containing a plurality of components and atomizing the mixed liquid into an atomized fine particle, thereby obtaining a mixed fluid of the atomized fine particle and air, and a collecting device 200 for separating the air from the mixed fluid obtained in the atomizing device 100 and collecting an atomized component. In the separating apparatus, the mixed liquid is atomized into the atomized fine particle to obtain the mixed fluid in the atomizing device 100 and the atomized liquid is separated from the mixed fluid into the liquids having different component contents. In the separating apparatus, furthermore, there is provided an outside air heat exchanger 79 for heating a carrier gas to be supplied to the surface of the liquid to be atomized by the ultrasonic vibration. In the separating apparatus, the carrier gas heated by the outside air heat exchanger 79 is supplied to the atomizing device 100, and the atomizing device 100 atomizes the liquid by the ultrasonic vibration while supplying the carrier gas heated with the thermal energy of the outside air to the surface of the liquid.

In the apparatus for separating a liquid according to the present invention, the outside air heat exchanger 79 can heat the carrier gas containing the air separated from the mixed fluid and can supply the heated carrier gas to the atomizing device 100. In the apparatus for separating a liquid according to the present invention, the outside air heat exchanger 79 can heat the carrier gas containing the air separated from the mixed fluid by the air separating machine 50 and can supply the heated carrier gas to the atomizing device 100.

The apparatus for separating a liquid according to the present invention comprises an atomizing device 100 for ultrasonically vibrating a mixed liquid containing a plurality of components and atomizing the mixed liquid into an atomized fine particle, thereby obtaining a mixed fluid of the atomized fine particle and air, and a collecting device 200 for separating the air from the mixed fluid obtained in the atomizing device 100 and collecting an atomized component. In the separating apparatus, the mixed liquid is atomized into the atomized fine particle to obtain the mixed fluid in the atomizing device 100, and the atomized liquid is separated from the mixed fluid into the liquids having different component contents. In the separating apparatus, furthermore, there is provided an outside air supplying device 78 for supplying outside air to a surface of the liquid to be atomized by the ultrasonic vibration. In the separating apparatus, the outside air supplying device 78 supplies the outside air to the atomizing device 100, and the atomizing device 100 atomizes the liquid by the ultrasonic vibration while supplying the thermal energy of the outside air to the surface of the liquid.

In the apparatus for separating a liquid according to the present invention, the mixed liquid to be supplied to the atomizing device 100 can be any of a crude oil, petroleum, a volatile oil, a light oil, gasoline, naphtha, kerosene, a heavy oil, a substance obtained by carrying out a cracking treatment over them with a catalyst, and their mixture. In the apparatus for separating a liquid according to the present invention, moreover, the mixed liquid can be separated into hydrocarbon mixtures having different numbers of carbons (n). In the apparatus for separating a liquid according to the present invention, furthermore, the mixed liquid can contain alcohols and water.

The separating method and apparatus described above has a feature that an energy consumption can be lessened and the atomized fine particle can be efficiently generated to separate the mixed liquid efficiently. The reason is as follows. The mixed liquid is atomized into the atomized fine particle by the ultrasonic vibration and the atomized fine particle is collected and is separated into the liquids having different component contents, and furthermore, the separation can be efficiently carried out by effectively utilizing the thermal energy of the outside air. More specifically, the mixed liquid is neither boiled nor vaporized for distillation differently from the conventional art. For this reason, it is not necessary to supply a great thermal energy which is equivalent to vaporization heat. In order to atomize and separate the liquid into the atomized fine particle, furthermore, the thermal energy of the outside air is utilized effectively to atomize and separate the liquid into the atomized fine particle very efficiently. In the method and apparatus described above, it is possible to efficiently atomize and separate the liquid into the atomized fine particle while setting the temperature of the air to be supplied to the surface of the liquid to be lower than the boiling point of the liquid to be separated. The reason is that the efficiency of atomizing the liquid into the atomized fine particle is increased by raising the temperature of the air to be a temperature which is equal to or lower than the boiling point. By effectively utilizing the thermal energy of the outside air, accordingly, it is possible to efficiently atomize the liquid into the atomized fine particle and to collect the atomized liquid, thereby separating the atomized liquid into liquids having different component contents efficiently.

The above and further objects and features of the invention will be more fully apparent from the following detailed description with accompanying drawings.

DETAILED DESCRIPTION OF THE PREFERRED EMBODIMENTS

Figure 1:
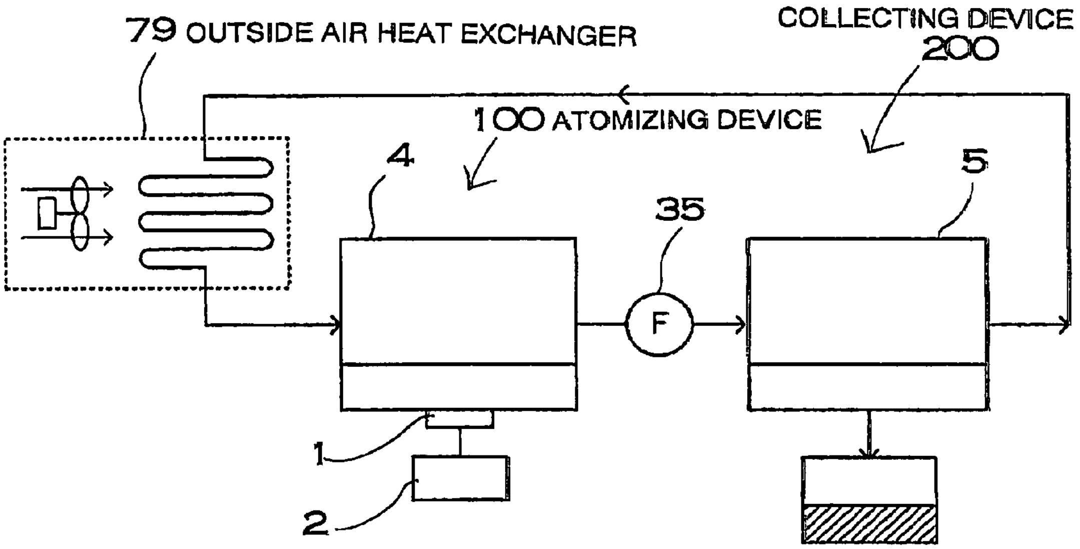
FIG. 1 is a schematic view showing a structure of an apparatus for separating a liquid according to an example of the present invention.

An apparatus for separating a liquid according to the present invention atomizes a mixed liquid containing a plurality of components into an atomized fine particle, and then collects the atomized fine particle and separates the atomized fine particle into liquids having different component contents. Although the present invention does not specify the mixed liquid, the mixed liquid is roughly divided into two parts. A first mixed liquid is a solution in which the mixed liquid containing a plurality of components contains a solvent and a solute, that is, a solution in which the solute is dissolved in the solvent. In the present invention, the mixed liquid is separated into a solution having a low concentration and a solution having a high concentration. A second mixed liquid contains a plurality of different components, for example, petroleum. The mixed liquid is separated into petroleum having different component contents in order to be distilled and separated into liquids having different component contents, for example, a heavy oil, a light oil, kerosene, naphtha or gasoline.

The solution of the mixed liquid having the solvent dissolved in the solute is as follows:

(1) sake, beer, wine, vinegar, mirin, spirits, shochu, brandy, whiskey and liqueur;

(2) a solution containing a perfume, an aromatic component or an aroma component such as pinene, linalol, limonene or polyphenols;

(3) a solution containing an organic compound belonging to any of alkane and cycloalkane to be saturated hydrocarbons, alkene and cycloalkene to be unsaturated hydrocarbons, or ether, thioether and aromatic hydrocarbons, or a substance bonded thereto;

(4) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with halogen;

(5) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a hydroxyl group;

(6) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with an amino group;

(7) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a carbonyl group;

(8) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a carboxyl group;

(9) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a nitro group;

(10) a solution containing an organic compound belonging to any of alkane, cycloalkane an alkyne to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a cyano group;

(11) a solution containing an organic compound belonging to any of alkane and cycloalkane to be saturated hydrocarbons, alkene, cycloalkene and alkyne to be unsaturated hydrocarbons, ether, thioether and aromatic hydrocarbons, or a substance obtained by substituting at least one hydrogen atom or functional group of their bonded body with a mercapto group;

(12) a solution containing a substance obtained by substituting at least one atom contained in the target substances in (3) to (11) described above with a metal ion; and

(13) a solution containing a substance obtained by substituting an optional hydrogen atom, carbon atom or functional group in molecules contained in the target substances in (3) to (11) described above with an optional one of the molecules in (3) to (11).

Moreover, the mixed liquid containing a plurality of different components is a crude oil, a light oil, a heavy oil, kerosene, gasoline or the like. In the present invention, the crude oil of the mixed liquid is separated into a heavy oil, a light oil, kerosene, naphtha, gasoline or the like, and furthermore, the light oil, the gasoline or the like is refined.

The mixed liquid is separated depending on a difference in the number of carbons (n) of a hydrocarbon mixture, a property to cause a surface excess by a migration to the surface, or the like. A liquid to be separated depending on the difference in the number of carbons (n) of the hydrocarbon mixture which has a small number of carbons (n) is separated as an atomized fine particle. In a mixed liquid containing a component having a property to cause the surface excess, moreover, a substance to cause the surface excess is collected as the atomized fine particle.

Description will be given to an apparatus and method for generating an atomized fine particle by an ultrasonic vibration from a solution containing the mixed liquid as alcohol, thereby obtaining alcohol having a high concentration. In the present invention, the mixed liquid is not specified to the alcohol but can be set to be all of the liquids described above.

Figure 2:
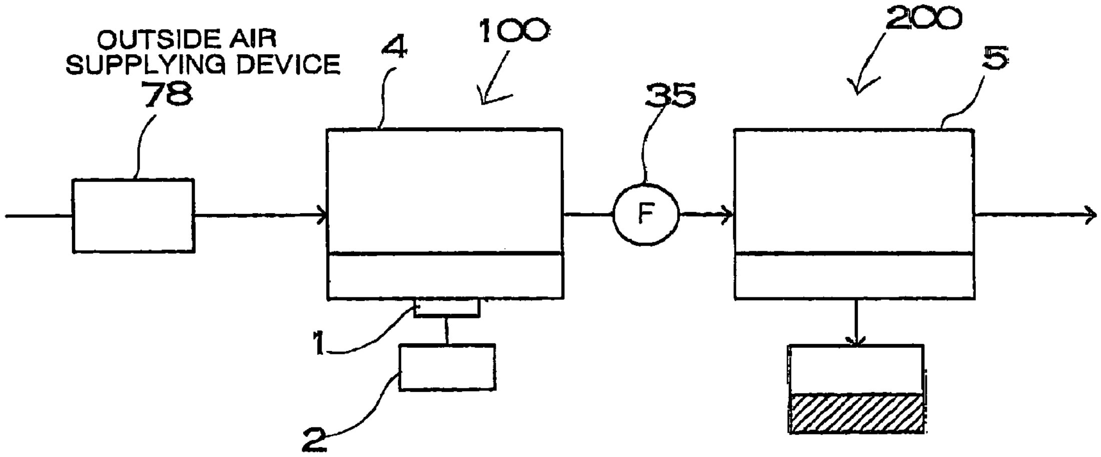
FIG. 2 is a schematic view showing a structure of an apparatus for separating a liquid according to another example of the present invention.
Figure 3:
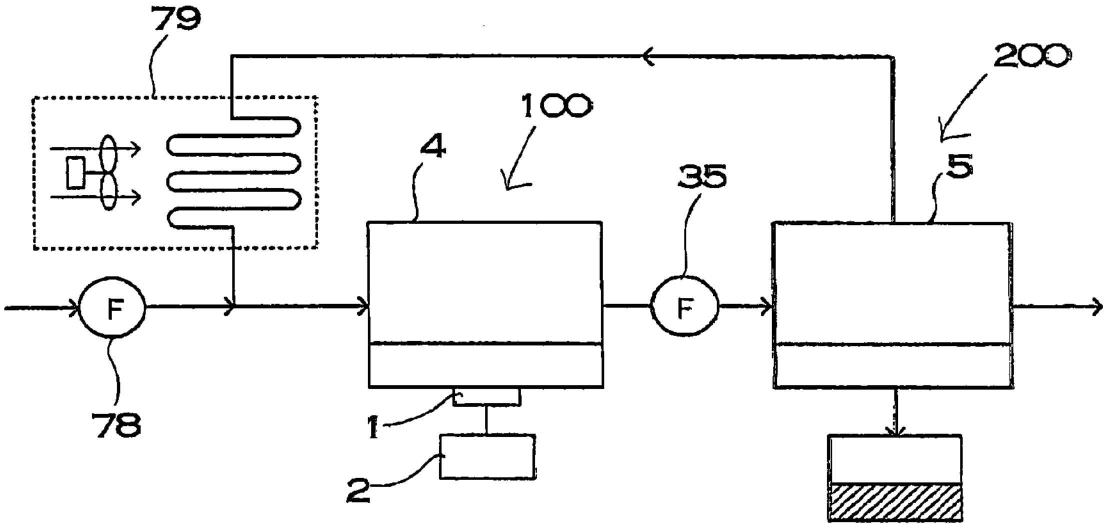
FIG. 3 is a schematic view showing a structure of an apparatus for separating a liquid according to a further example of the present invention.

The separating apparatuses shown in FIGS. 1 to 3 comprise an atomizing device 100 for ultrasonically vibrating a mixed liquid containing a plurality of components and atomizing the mixed liquid into an atomized fine particle, thereby obtaining a mixed fluid of the atomized fine particle and air, a collecting device 200 for separating the air from the mixed fluid obtained by the atomizing device 100 and collecting the atomized component, and a forcible delivering machine 35 for delivering the mixed fluid from the atomizing device 100 to the collecting device 200. The apparatus serves to atomize the mixed liquid into the atomized fine particle by means of the atomizing device 100 to obtain a mixed fluid, to move the mixed fluid to the collecting device 200, and to separate the atomized liquid from the mixed fluid into liquids having different component contents by means of the collecting device 200.

The separating apparatus shown in FIG. 1 is provided with an outside air heat exchanger 79 for raising the temperature of a carrier gas to be supplied to the surface of the liquid to be atomized by the ultrasonic vibration. The apparatus supplies the carrier gas having the temperature raised by the outside air heat exchanger 79 to the atomizing device 100. The atomizing device 100 serves to atomize the liquid by the ultrasonic vibration while supplying the carrier gas having the temperature raised by the thermal energy of the outside air to the liquid surface.

The separating apparatus shown in FIG. 2 supplies the outside air to the surface of the liquid to be atomized by the ultrasonic vibration. In order to supply the outside air to the atomizing chamber 4, the apparatus in this drawing is provided with an outside air supplying device 78. The outside air supplying device 78 is a fan taking the outside air into the atomizing chamber 4. The outside air supplying device 78 takes and supplies the outside air into the atomizing chamber 4 in the atomizing device 100. The atomizing device 100 atomizes the liquid by the ultrasonic vibration while supplying the thermal energy of the outside air to the liquid surface. The outside air supplying device 78 can be set to be every mechanism capable of supplying the outside air to the atomizing chamber 4. For example, in an apparatus for setting the atomizing chamber to have a negative pressure, the atomizing chamber can be provided with an opening portion to supply the outside air. In this apparatus, accordingly, the opening portion can be set to be the outside air supplying device. The outside air supplying device to be the opening portion can regulate an opening area to control the amount of the outside air to be taken into the atomizing chamber.

Furthermore, the apparatus shown in FIG. 3 raises the temperature of the carrier gas by means of the outside air heat exchanger 79 and supplies the carrier gas to the atomizing chamber 4, and furthermore, directly supplies the outside air to the atomizing chamber 4 in the atomizing device 100. Accordingly, this apparatus comprises both the outside air heat exchanger 79 and the outside air supplying device 78. The separating apparatus partially discharges the air to be the carrier gas to an outside by means of the collecting device 200 and supplies the outside air corresponding to the amount of the air to be discharged to the atomizing device 100.

Figure 4:
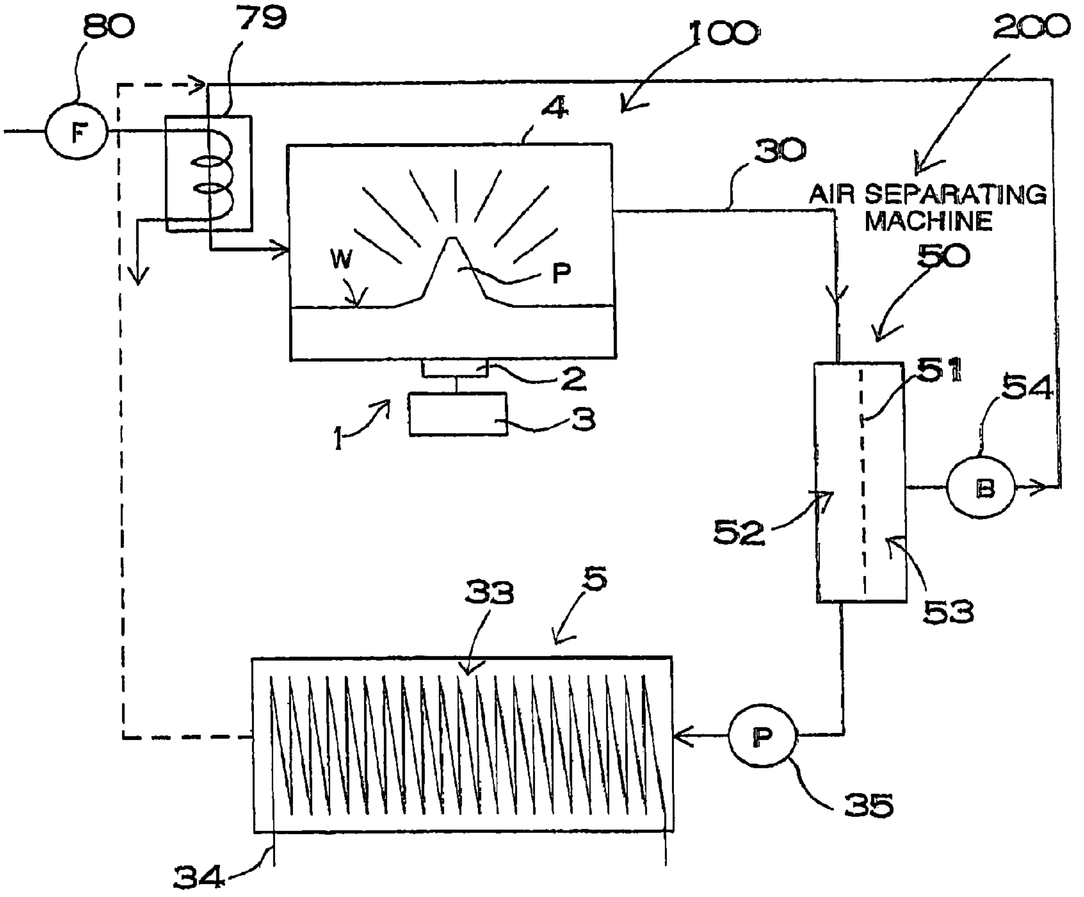
FIG. 4 is a schematic view showing a structure of an apparatus for separating a liquid according to a further example of the present invention.
Figure 5:
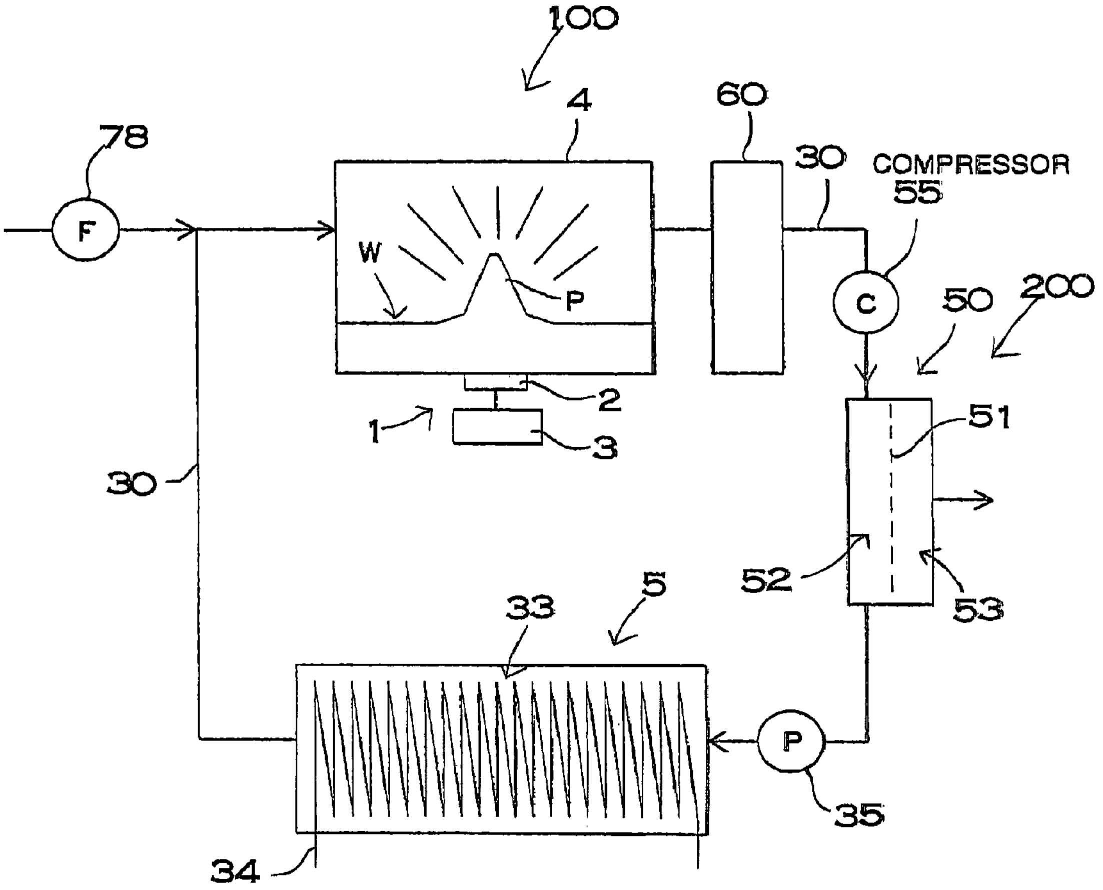
FIG. 5 is a schematic view showing a structure of an apparatus for separating a liquid according to a further example of the present invention.
Figure 6:
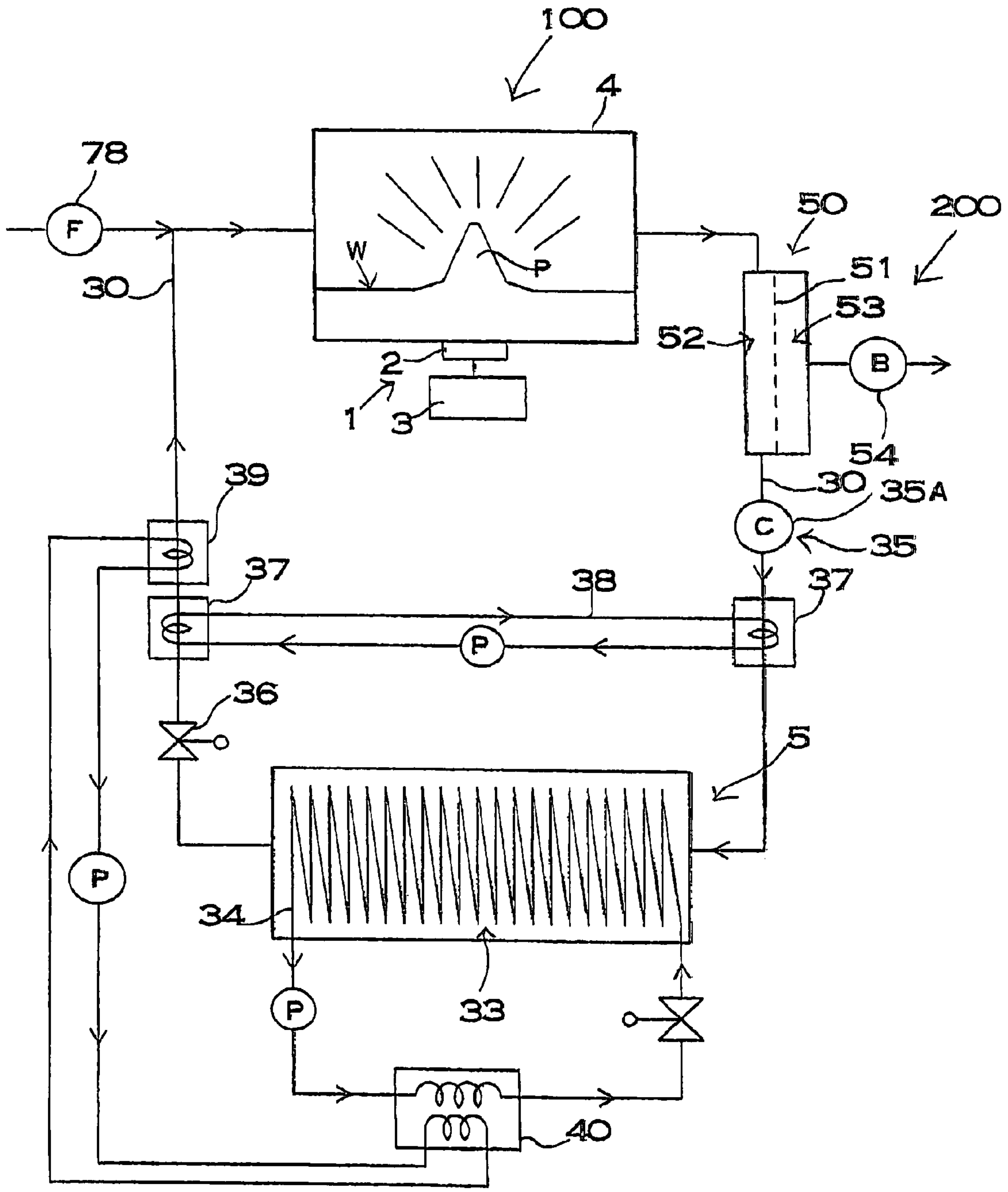
FIG. 6 is a schematic view showing a structure of an apparatus for separating a liquid according to a further example of the present invention.

The above separating apparatus will be described below in more detail. In the separating apparatus shown in FIGS. 4 to 7, the atomizing device 100 is provided with the atomizing machine 1 for atomizing the mixed liquid into the atomized fine particle. The collecting device 200 includes an air separating machine 50 for separating air from a mixed fluid containing the atomized fine particle which is atomized in the atomizing chamber 1 and the air, a collecting chamber 50 for further coagulating and collecting the mixed fluid from which a part of the air is separated by the air separating machine 50, and the forcible delivering machine 35 for moving the mixed fluid. In the apparatus shown in this drawing, the forcible delivering machine 35 is provided in the collecting device 200. The forcible delivering machine 35 can also be provided between the atomizing device 100 and the collecting device 200 as shown in FIGS. 4 to 6.

Figure 7:
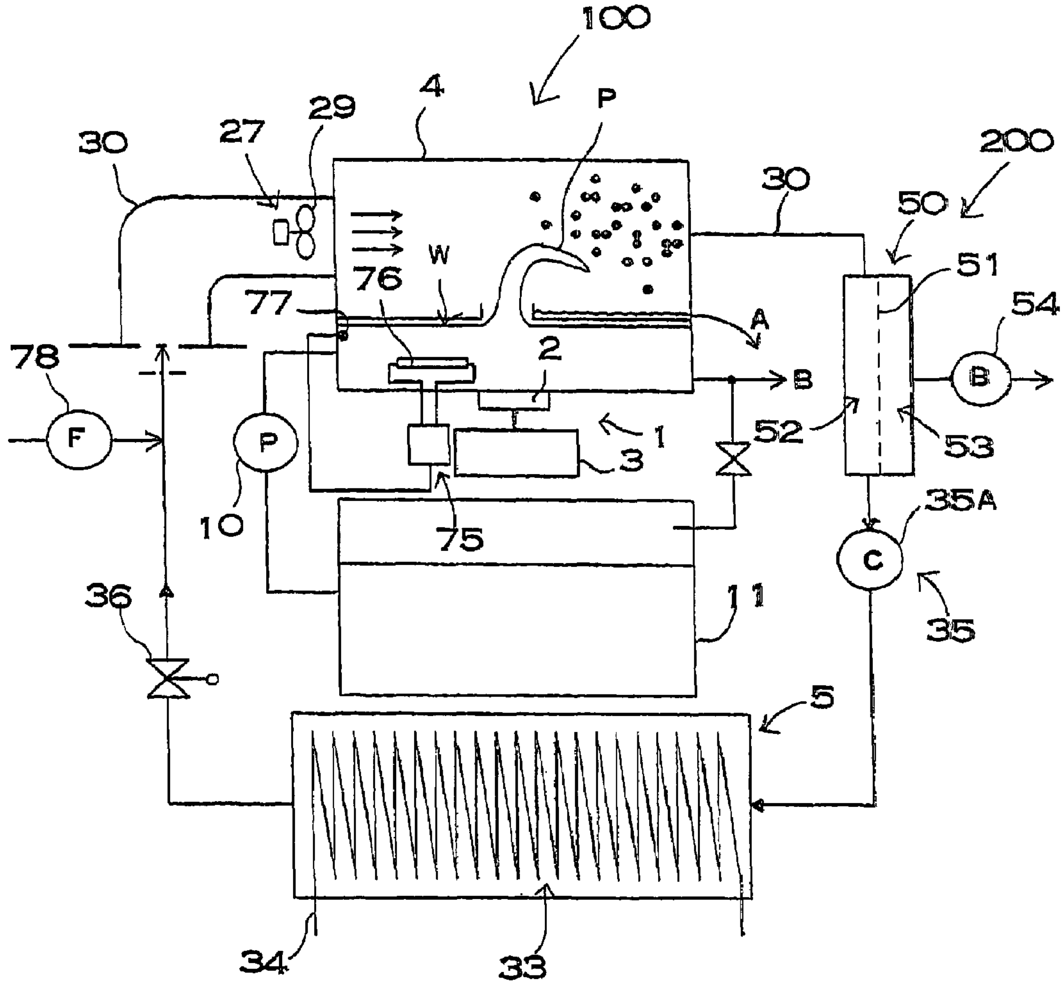
FIG. 7 is a schematic view showing a structure of an apparatus for separating a liquid according to a further example of the present invention.

The apparatus shown in FIG. 7 comprises a pump 10 for supplying a mixed liquid to the atomizing chamber 4, and supplies the mixed liquid to the atomizing chamber 4 by means of the pump 10. The atomizing chamber 4 does not atomize, as the atomized fine particles, all the mixed liquids which are supplied. When all of the mixed liquids are atomized and collected into the collecting chamber 5, the mixed liquid concentration of alcohol or the like in the liquid collected into the collecting chamber 5 is made equal to that of the mixed liquid supplied to the atomizing chamber 4. The concentration of the mixed liquid supplied to the atomizing chamber 4 is reduced when the same mixed liquid is atomized as the atomized fine particle so that a capacity is decreased. For this reason, the concentration of the mixed solution contained in the atomized fine particle is also decreased gradually. The mixed liquid in the atomizing chamber 4 is exchanged with a new mixed liquid when the concentration of the mixed solution is reduced.

In the case in which a solution having a solute dissolved in a solvent is used as the mixed solution to separate a solution having a high concentration, for example, the atomizing chamber 4 atomizes a mixed liquid having the concentration of the solution which is 10 to 50% by weight and exchanges the mixed liquid with a new mixed liquid after the concentration of the mixed liquid is reduced. In the case in which petroleum is used for the mixed liquid, a part of the petroleum is atomized into an atomized fine particle after the passage of a certain time and the mixed liquid is then exchanged into a new mixed liquid. In this method, the mixed liquid is exchanged with a new mixed liquid after the passage of a certain time, that is, the mixed liquid is exchanged in a batch type. It is also possible to couple an undiluted solution reservoir 11 storing the mixed liquid therein to the atomizing chamber 4 through the pump 10, thereby supplying the mixed liquid from the undiluted solution reservoir 11 continuously. This apparatus supplies the mixed liquid from the undiluted solution reservoir 11 while discharging the mixed liquid in the atomizing chamber 4, thereby preventing the concentration of the mixed liquid in the atomizing chamber 4 from being decreased. As shown in an arrow B of FIG. 7, moreover, it is also possible to discharge the mixed liquid in the atomizing chamber 4 to an outside without circulating the same mixed liquid to the undiluted solution reservoir 11, thereby preventing the concentration of the mixed solution contained in the undiluted solution reservoir 11 from being decreased.

The mixed liquid in the atomizing chamber 4 is atomized into an atomized fine particle by the atomizing machine 1. In the case in which an alcohol solution is used as the mixed liquid, the atomized fine particle atomized by the atomizing machine 1 has a higher concentration than the residual liquid. The reason is that the alcohol is changed into the atomized fine particle more easily than water to be a solvent. Accordingly, it is possible to efficiently separate the mixed liquid having a high concentration by atomizing the mixed liquid into the atomized fine particle by means of the atomizing machine 1 to coagulate and collect the atomized fine particle. In the case in which the petroleum is used as the mixed liquid, the concentration of a hydrocarbon mixture which is easily atomized in the atomized fine particle is higher than that of the residual liquid. When the petroleum is atomized into the atomized fine particle by means of the atomizing machine 1 and the atomized fine particle is collected, accordingly, it is possible to efficiently separate the petroleum having a larger content of the hydrocarbon mixture which is easily atomized, that is, has a small number of carbons (n).

The atomizing machine 1 includes a plurality of ultrasonic vibrators 2 and an ultrasonic power supply 3 for supplying a high frequency power to the ultrasonic vibrator 2. The atomizing machine 1 is preferably vibrated ultrasonically at a frequency of 1 MHz or more, thereby atomizing the mixed solution. By using the atomizing machine 1, it is possible to obtain a feature that the mixed solution can be atomized into a very fine atomized particle. Although the atomizing machine is not specified to the ultrasonic vibration in the present invention, it is possible to reduce an oscillation frequency to be lower than 1 MHz in the atomizing machine using the ultrasonic vibration.

Figure 8:
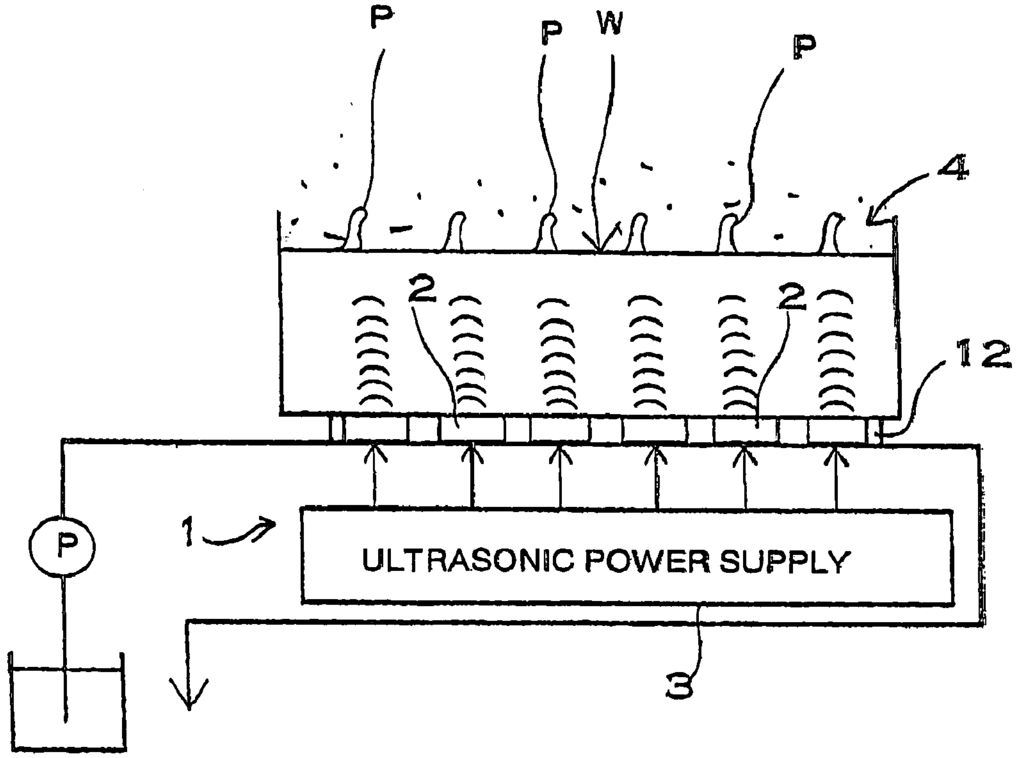
FIG. 8 is a schematic sectional view showing an example of an atomizing chamber and an atomizing machine.

The atomizing machine 1 to ultrasonically vibrate the mixed liquid scatters the mixed solution as the atomized fine particle from a mixed liquid surface W. When the mixed liquid is ultrasonically vibrated, a liquid column P is formed on the mixed liquid surface W so that the atomized fine particle is generated from the surface of the liquid column P. The atomizing machine 1 shown in FIG. 8 is provided with the ultrasonic vibrator 2 upward on the bottom of the atomizing chamber 4 filled with the mixed liquid. The ultrasonic vibrator 2 radiates an ultrasonic wave upward from the bottom toward the mixed liquid surface W, and ultrasonically vibrates the mixed liquid surface W, thereby generating the liquid column P. The ultrasonic vibrator 2 radiates the ultrasonic wave in a vertical direction.

The atomizing machine 1 shown in the drawing includes a plurality of ultrasonic vibrators 2 and the ultrasonic power supply 3 for ultrasonically vibrating these ultrasonic vibrators 2. The ultrasonic vibrator 2 is fixed in a watertight structure to the bottom of the atomizing chamber 4. An apparatus in which the ultrasonic vibrators 2 ultrasonically vibrate the mixed liquid atomizes the mixed liquid into the atomized fine particle more efficiently.

Figure 9:
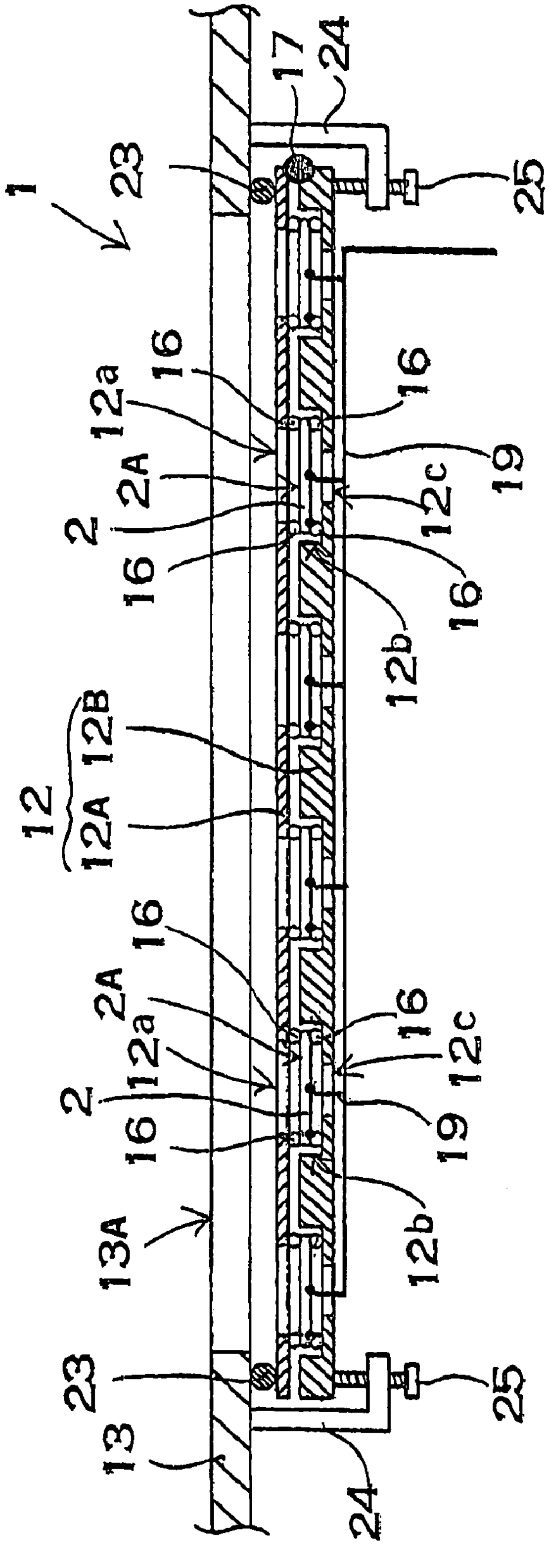
FIG. 9 is an enlarged sectional view showing an example of a coupling structure of an ultrasonic vibrator and a removable plate.
Figure 10:
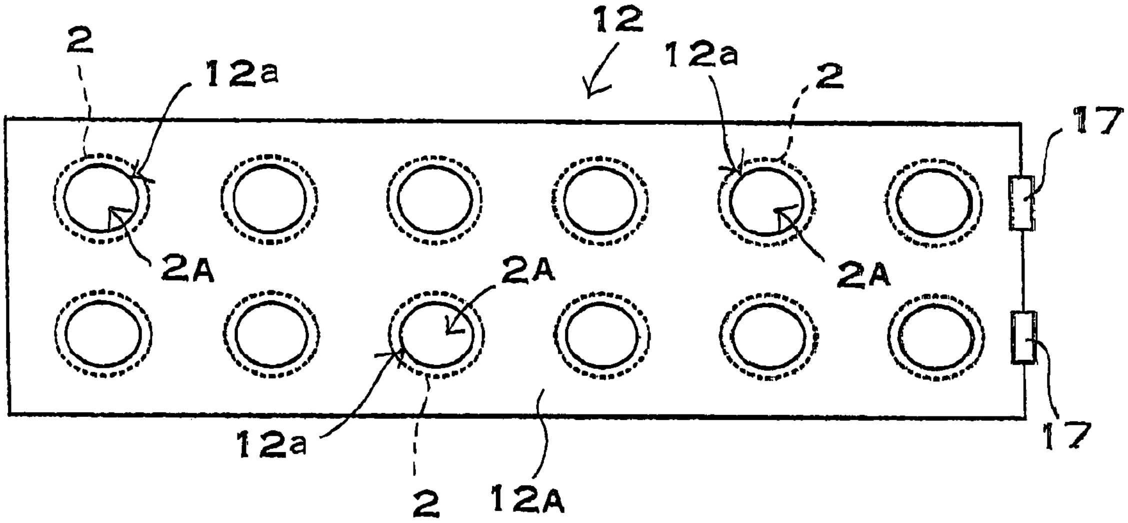
FIG. 10 is a plan view showing the removable plate illustrated in FIG. 9.

The ultrasonic vibratos 2 are fixed to the removable plate 12 in a waterproof structure as shown in FIGS. 9 and 10. The removable plate 12 fixing the ultrasonic vibrators 2 is attached to a casing 13 in the atomizing chamber 4 so as to be removable in the waterproof structure. The removable plate 12 is attached to the casing 13 of the atomizing chamber 4 so that each of the ultrasonic vibrators 2 ultrasonically vibrates the mixed liquid in the atomizing chamber 4.

The removable plate 12 shown in FIGS. 9 and 10 includes a surface plate 12A and a back plate 12B, and the surface plate 12A and the back plate 12B are laminated and the ultrasonic vibrator 2 is interposed between the surface plate 12A and the back plate 12B in the waterproof structure. The surface plate 12A has a through hole 12*a* opened and a vibrating surface 2A is positioned in the through hole 12*a* so that the ultrasonic vibrator 2 is interposed and fixed between the surface plate 12A and the back plate 12B. The back plate 12B is provided with a concave portion 12*b* for fitting the ultrasonic vibrator 2 therein, and the ultrasonic vibrator 2 is fitted in the concave portion 12*b*. While the removable plate 12 shown in FIG. 9 has the concave portion 12*b* provided on the back plate 12B, a concave portion can also be provided on the back plate to fit the ultrasonic vibrator therein.

In order to employ the waterproof structure between the ultrasonic vibrator 2 and the back plate 12A, a packing 16 is interposed between the surface plate 12A and the ultrasonic vibrator 2. In the atomizing machine 1 shown in FIG. 9, the packing 16 is also interposed between the ultrasonic vibrator 2 and the back plate 12B to employ the waterproof structure. The atomizing machine does not need to employ the waterproof structure between the ultrasonic vibrator and the back plate. The reason is as follows. The removable plate to employ the waterproof structure between the ultrasonic vibrator and the back plate is fixed to the lower surface of the casing in the atomizing chamber so that the mixed liquid in the atomizing chamber can be prevented from leaking. The packing 16 is an O ring of a rubber elastic member. The packing 16 of the O ring is provided on the opposed surfaces of the outer peripheral edge of the vibrating surface 2A of the ultrasonic vibrator 2 and the surface plate 12A, and the waterproof structure is employed between the vibrating surface 2A of the ultrasonic vibrator 2 and the surface plate 12A to prevent water from leaking out. Furthermore, the outer periphery of the ultrasonic vibrator 2 and the back plate 12B are coupled to each other in the waterproof structure.

The packing 16 is a rubber elastic member such as Teflon (registered trademark), silicon, natural or synthetic rubber, or the like. The packing 16 is interposed in an elastic deformation and crush state between the ultrasonic vibrator 2 and the surface plate 12A and between the ultrasonic vibrator 2 and the back plate 12B and adheres to the ultrasonic vibratos 2 and the surfaces of the surface plate 12A and the back plate 12B without a clearance so that the coupling portion takes the waterproof structure. For the packing 16, it is also possible to use a metal packing obtained by processing, like a ring, a metal such as copper, brass, aluminum or stainless.

The removable plate 12 shown in FIGS. 9 and 10 couples the either side edges of the surface plate 12A and the back plate 12B through a hinge 17. The removable plate 12 can easily remove and attach the ultrasonic vibrator 2 by opening the back plate 12B and the surface plate 12A. When the ultrasonic vibrator 2 is to be exchanged, the back plate 12B and the surface plate 12A are opened. In this condition, an old ultrasonic vibrator is taken out and a new ultrasonic vibrator 2 and a new packing 16 are put in predetermined positions. Then, the back plate 12B and the surface plate 12A are closed so that the ultrasonic vibrator 2 is exchanged. The back plate 12B and the surface plate 12A which are closed are coupled at the opposite side of the hinge 17 with a setscrew (not shown) or are fixed and coupled to the casing 13 of the atomizing chamber 4.

Figure 13:
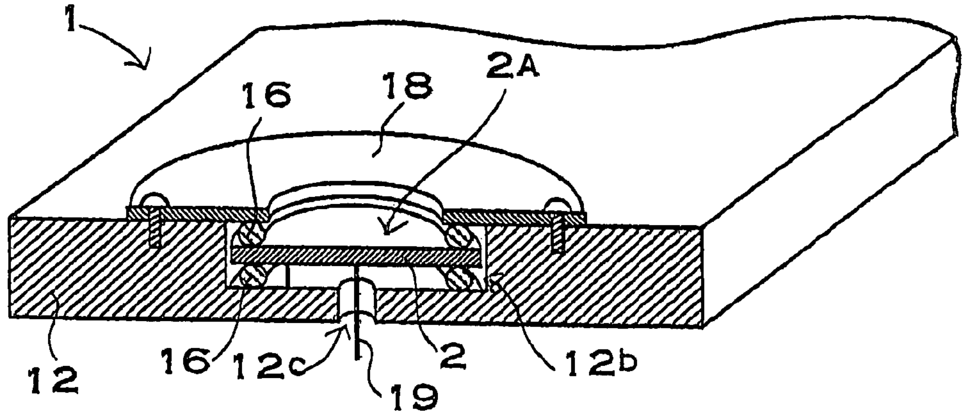
FIG. 13 is an enlarged sectional perspective view showing another example of the coupling structure of the ultrasonic vibrator and the removable plate.
Figure 14:
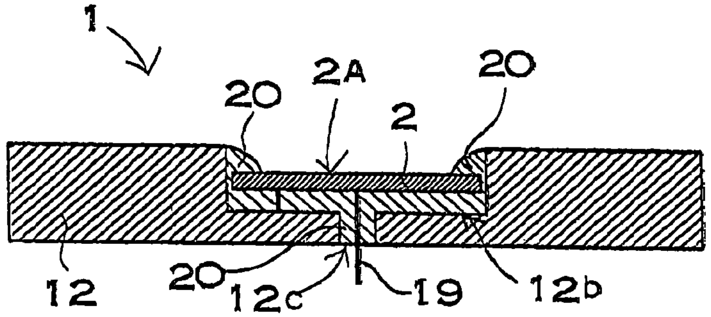
FIG. 14 is an enlarged sectional view showing a further example of the coupling structure of the ultrasonic vibrator and the removable plate.
Figure 15:
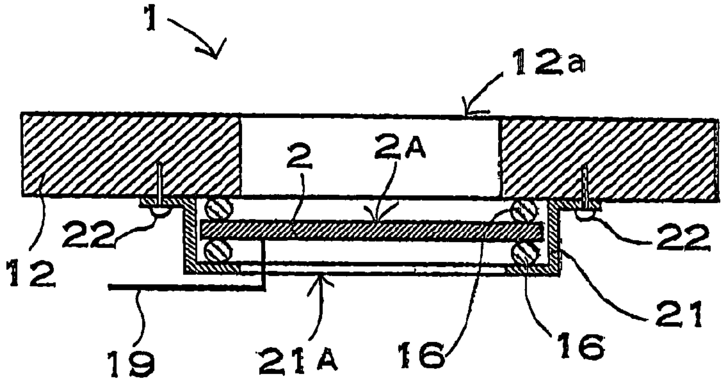
FIG. 15 is an enlarged sectional view showing a further example of the coupling structure of the ultrasonic vibrator and the removable plate.

While the atomizing machine 1 described above employs the waterproof structure by using the packing 16, it is also possible to employ the waterproof structure by filling a coking material in the position of the packing 16. While the removable plate 12 is constituted by two meal plates or non-metal hard plates including the surface plate 12A and the back plate 12B in the atomizing machine 1 shown in FIG. 9, furthermore, the removable plate 12 can also be formed by one plate as shown in FIGS. 13 to 15. The removable plate 12 is a metal plate or a non-metal hard plate and has the concave portion 12*b* for providing the ultrasonic vibratos 2 in an upper part or the through hole 12*a* opened.

In the atomizing machine 1 shown in FIG. 13, the ultrasonic vibratos 2 is put in the concave portion 12*b* of the removable plate 12 and the packing 16 is provided in the upper and lower parts of the outer peripheral portion of the ultrasonic vibrator 2. Furthermore, a ring plate 18 is fixed to the opening portion of the removable plate 12. The ring plate 18 presses the packing 16 provided on the upper surface of the ultrasonic vibrator 2, thereby fixing the ultraviolet vibrator 2 to the concave portion 12*b* In the waterproof structure. The concave portion 12*b* has the through hole 12*c* provided on a bottom and a lead wire 19 is led out.

In the atomizing machine 1 shown in FIG. 14, neither the packing nor the ring plate is used and the ultrasonic vibrator 2 put in the concave portion 12*b* of the removable plate 12 is bonded and fixed through a coking material 20 in the waterproof structure. The ultrasonic vibrator 2 also leads the lead wire 19 out of the through hole 12*c* opened on the bottom of the concave portion 12*b*. The coking material 20 is also filled between the through hole 12*c* and the lead wire 19 so that the waterproof structure in which water can be prevented from leaking is obtained.

In the atomizing machine 1 shown in FIG. 15, the through hole 12*a* is opened on the removable plate 12, and the vibrating surface 2A is positioned on the through hole 12*a* and the ultrasonic vibrator 2 is thus fixed to the lower surface of the removable plate 12. In order to fix the ultrasonic vibrator 2 to the removable plate 12, a fixture 21 is secured to the bottom face of the removable plate 12. The ultrasonic vibrator 2 is fixed to the removable plate 12 in the waterproof structure through the packing 16 provided in the upper and lower parts of the outer peripheral portion. The fixture 21 takes the shape of a ring having a step concave portion, and a fixing screw 22 penetrating through an outer peripheral edge portion is screwed and fixed into the removable plate 12. The fixture 21 presses the packing 16 provided on the lower surface of the ultrasonic vibrator 2 at the bottom face of the step concave portion and fixes the ultrasonic vibrator 2 to the removable plate 12 in the waterproof structure. The fixture 21 is provided with a through hole 21A on the bottom face of the step concave portion from which the lead wire 19 is led out.

Figure 11:
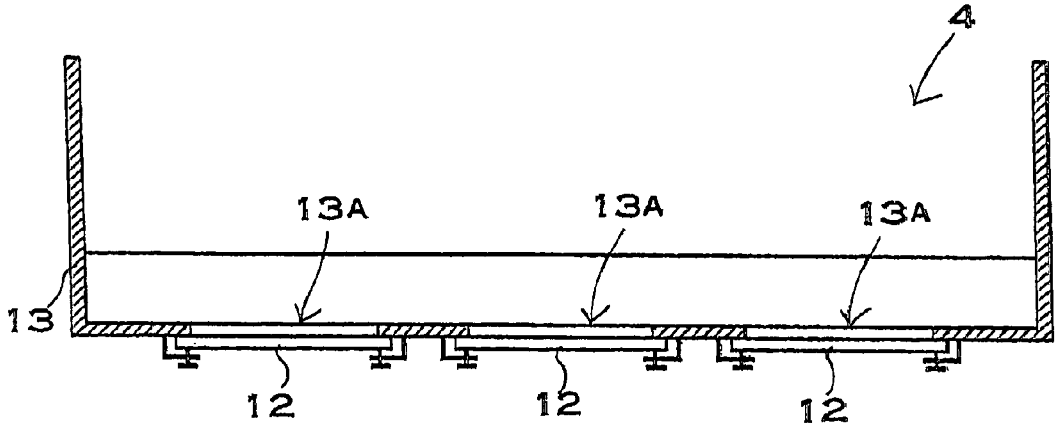
FIG. 11 is a sectional view showing a state in which the removable plate is attached to the atomizing chamber.
Figure 12:
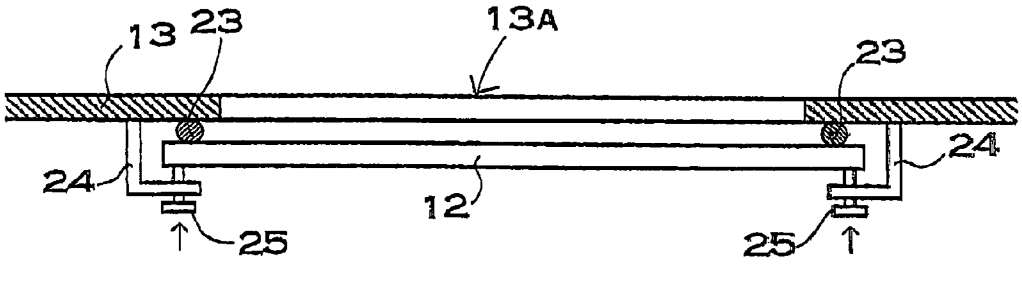
FIG. 12 is an enlarged sectional view showing the coupling structure of the removable plate and the atomizing chamber illustrated in FIG. 11.

FIGS. 11 and 12 show the atomizing chamber 4 for fixing the atomizing machine 1. The atomizing chamber 4 shown in these drawings has an opening portion 13A provided on the bottom face of the casing 13, and the removable plate 12 is fixed to close the opening portion 13A in the waterproof structure. The removable plate 12 is fixed to the casing 13 through a packing 23 in the waterproof structure. In order to fix the removable plate 12, a fixture 24 is secured to the bottom face of the casing 13. The fixture 24 is L-shaped, and presses the removable plate 12 through a setscrew 26 penetrating therethrough and fixes the removable plate 12 to the casing 13 of the atomizing chamber 4. With this structure, the ultrasonic vibrators 2 fixed to the atomizing chamber 4 ultrasonically vibrates the mixed liquid from the bottom face of the casing 13 toward an upper surface. The removable plate 12 is attached removably to the bottom face of the casing 13 of the atomizing chamber 4 in order to close the opening portion 13A.

Figure 16:
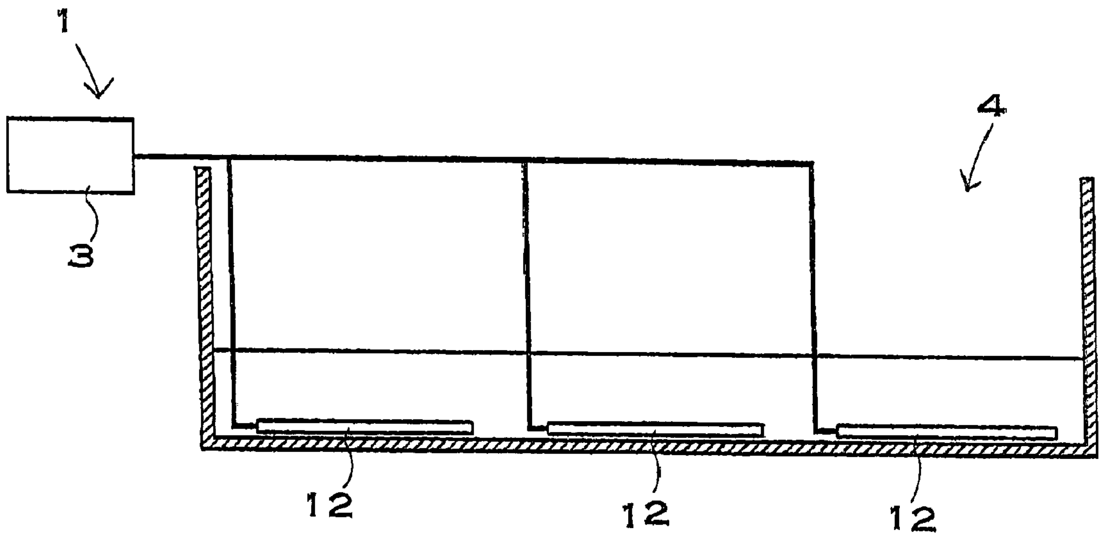
FIG. 16 is a sectional view showing another example of the arrangement of the removable plate in the atomizing chamber.

The removable plate 12 can also be immersed in the mixed liquid in the atomizing chamber 4 to ultrasonically vibrate the mixed liquid as shown in FIG. 16. With this structure, the removable plate 12 can easily be provided removably in the atomizing chamber 4. With the structure shown in FIG. 14, for example, the atomizing machine 1 immersed in the mixed liquid fixes a portion excluding the vibrating surface 2A of the ultrasonic vibrator 2 to the removable plate 12 in the waterproof structure.

In some cases in which the mixed liquid in the atomizing chamber 4 is excessively heated to a high temperature by means of the ultrasonic vibrator 2 and the ultrasonic power supply 3, quality is deteriorated. It is possible to eliminate this drawback by forcibly cooling the ultrasonic vibrator 2. Furthermore, it is preferable that the ultrasonic power supply 3 should also be cooled. Although the ultrasonic power supply 3 does not directly heat the mixed liquid, surroundings are heated so that the mixed liquid is indirectly heated. The ultrasonic vibrator 2 and the ultrasonic power supply 3 can be provided in a state in which a cooling pipe is thermally coupled to them, that is, the cooling pipe is caused to come in contact therewith, and can be thus cooled. The cooling pipe causes a liquid cooled by a cooling machine or a refrigerant, or cooling water such as underground water or service water to flow to cool the ultrasonic vibrator 2 and the ultrasonic power supply 3.

Furthermore, the separating apparatus shown in FIG. 7 comprises a temperature control mechanism 75 for controlling the temperature of the mixed liquid in the atomizing chamber 4. The temperature control mechanism 75 raises the temperature of the mixed liquid in such a manner that the temperature of the mixed liquid reaches a predetermined temperature. The temperature control mechanism 75 detects the temperature of the mixed liquid stored in the atomizing chamber 4 by means of a temperature sensor 77, and furthermore, controls a heater 76 to maintain the temperature of the mixed liquid to be a set temperature. Thus, the separating apparatus for controlling the temperature of the liquid by the temperature control mechanism 75 can efficiently atomize the mixed liquid into the atomized fine particle.

The temperature of the mixed liquid influences the efficiency of atomizing the mixed liquid into the atomized fine particle by the ultrasonic vibration. When the temperature of the mixed liquid is reduced, the efficiently of the atomization into the atomized fine particle is deteriorated. Referring to a mixed liquid such as alcohol, it is possible to lessen a deterioration in quality by reducing a temperature. When the temperature of the mixed liquid is low, the efficiency of the atomization into the atomized fine particle is deteriorated. For this reason, the temperature of the mixed liquid is set to be a temperature at which the atomization into the atomized fine particle can be carried out efficiently with the prevention of the deterioration in the case in which the mixed liquid is changed depending on the temperature. A mixed liquid in which a deterioration in quality is small with a rise in a temperature or rarely becomes a problem can be efficiently atomized into the atomized fine particle with a rise in the temperature of the liquid.

In the separating apparatus shown in FIG. 7, furthermore, an ultrasonic vibration is carried out in the atomizing chamber 4 to cause air to blow from a blower mechanism 27 onto the liquid column P formed on the mixed liquid surface W. The blower mechanism 27 shown in FIG. 7 includes a fan 29 for causing the air to blow to the liquid column 27. Thus, the separating apparatus in which the air is blown against the liquid column P by means of the blower mechanism 27 has a feature that the atomization into the atomized fine particle can be efficiently carried out from the surface of the liquid column P. The separating apparatus according to the present invention does not need to comprise the blower mechanism to cause the air to blow against the liquid column as shown in FIGS. 4 to 6.

The air separating machine 50 serves to separate air from a mixed fluid supplied from the atomizing chamber 4. The air separating machine 50 partitions the inner part of an air transmitting film 51 into a primary side passage 52 and a secondary side discharge path 53. The primary side passage 52 is coupled to the atomizing machine 1 to cause the mixed fluid to pass therethrough. The secondary side discharge path 53 discharges the air separated from the mixed fluid by a transmission through the air transmitting film 51.

The air transmitting film 51 causes only the air to pass therethrough and does not cause the mixed liquid to pass therethrough. In the air transmitting film 51, accordingly, there is used a molecular sieve to be a film having a pore size which does not cause the mixed liquid to pass therethrough but causes the air to pass therethrough. The air contains approximately 80% of nitrogen and approximately 20% of oxygen. Therefore, the air transmitting film 51 has such a pore size as to cause the nitrogen and the oxygen to pass therethrough. The pore size of the air transmitting film 51 is preferably 0.4 nm to 0.5 nm. The air transmitting firm 51 does not cause a mixed liquid such as ethanol having a larger size than the pore size to pass therethrough but causes the air containing the nitrogen and the oxygen having a smaller size than the pore size to pass therethrough. The air transmitting film 51 having the pore size is fabricated by coating the surface of ceramic with zeolite, for example.

In the air separating machine 50, the primary side passage 52 is coupled to the atomizing chamber 4 to cause the mixed fluid to come in contact with the primary side surface of the air transmitting film 51. Furthermore, the secondary side discharge path 53 is coupled to a forcible exhaust machine 54 in the apparatuses shown in FIGS. 4, 6 and 7, and a compressor 55 is coupled to the primary side passage 52 and the pressure of the primary side surface is set to be higher than that of the secondary side surface on an opposite side to cause the air of the mixed fluid to pass through the air transmitting film 51, thereby separating a part or whole of the air of the mixed fluid in the apparatus of FIG. 5.

The forcible exhaust machine 54 is a suction pump such as a vacuum pump for forcibly sucking and discharging the air. The forcible exhaust machine 54 couples a suction side to the secondary side discharge path 53, thereby discharging the air in the secondary side discharge path 53 forcibly. In the secondary side discharge path 53 through which the air is discharged, a pressure is lower than an atmospheric pressure and is thus lower than the pressure in the primary side passage 52. More specifically, the pressure in the primary side passage 52 is relatively higher than that in the secondary side discharge path 53. In this condition, the air contained in the mixed fluid is transmitted through the air transmitting film 51, and then passes from the primary side passage 52 to the secondary side discharge path 53 and is thus separated from the mixed fluid.

The apparatus shown in FIG. 5 presses the mixed fluid into the primary side passage 52 through the pressing machine 55. The pressing machine 55 has a suction side coupled to the atomizing chamber 4. The secondary side discharge path 53 is opened to the air. It is also possible to couple the forcible discharge machine to the secondary side discharge path, thereby reducing the pressure in the secondary side discharge path to be equal to or lower than the atmospheric pressure. The compressor 55 pressurizes the mixed fluid to have an atmospheric pressure of more and presses the mixed fluid into the primary side passage 52, and the pressure of the primary side passage 52 is set to be higher than that of the secondary side discharge path 53. In this condition, the air contained in the mixed fluid is transmitted through the air transmitting film 51 depending on a difference in a pressure between the primary side surface and the secondary side surface. The air transmitted through the air transmitting film 51 is moved from the primary side passage 52 to the secondary side discharge path 53 and is separated from the mixed fluid. With this structure, the difference in a pressure between the primary side surface and the secondary side surface in the air transmitting film 51 can be increased. Therefore, it is possible to quickly separate the air of the mixed fluid. The reason is that the compressor 55 can press the mixed fluid into the primary side passage 52 at a high pressure.

In the apparatus shown in FIG. 5, furthermore, the suction side of the compressor 55 is coupled to the atomizing chamber 4 through a collecting chamber 60 in a former stage. The separating apparatus can couple, as the collecting chamber 60 in the former stage, any of a cyclone, a punching plate, a demister, a chevron, a scrubber, a spray tower and an electrostatic collecting machine, thereby collecting the atomized fine particle. The separating apparatus shown in FIG. 5 disposes these mechanisms between the air separating machine 50 and the atomizing chamber 4, thereby forming the collecting chamber 60 in the former stage. This apparatus supplies, to the air separating machine 50, a mixed fluid obtained by collecting a part of the atomized fine particles through the collecting machine 60 in the former stage. The separating machine can also couple any of the cyclone, the punching plate, the demister, the chevron, the scrubber, the spray tower and the electrostatic collecting machine between the air separating machine and the collecting chamber, thereby collecting the atomized fine particle, which is not shown.

The air separated by the air separating machine 50 does not contain the mixed liquid. The apparatus shown in FIG. 4 supplies, as a carrier gas, the air separated by the air separating machine 50 to the atomizing chamber 4. The apparatus for supplying the air separated by the air separating machine 50 to the atomizing chamber 4 can efficiently atomize the atomized fine particle in the atomizing chamber 4. The reason is that the air separated from the mixed fluid by the air separating machine 50 does not contain the mixed liquid. Moreover, the air to be the carrier gas separated by the air separating machine 50 is heated by the outside air heat exchanger 79 and is supplied to the atomizing chamber 4, and the automated fine particle is efficiently generated in the atomizing chamber 4.

The mixed fluid from which the air is separated by the air separating machine 50 has a small air content. In other words, the amount of the atomized fine particle for the air is increased so that the mixed liquid of the atomized fine particle is brought into an oversaturation state. Therefore, it is possible to efficiently collect the atomized fine particle in the collecting chamber 5. Since the air is separated by the air separating machine 50, the amount of the air in the mixed fluid supplied to the collecting chamber 5 is lessened more greatly than the mixed fluid discharged from the atomizing chamber 4.

The mixed fluid from which a part of the air is separated by the air separating machine 50 is moved to the collecting chamber 5. The mixed fluid is supplied to the collecting chamber 5 by the forcible delivering machine 35 formed by a blower or a compressor. The forcible delivering machine 35 is coupled between the air separating machine 50 and the collecting chamber 5 in order to supply the mixed fluid from the air separating machine 50 to the collecting chamber 5. The forcible delivering machine 35 absorbs the mixed fluid from which a part of the air is separated by the air separating machine 50, and supplies the mixed fluid to the collecting chamber 5.

The apparatuses shown in FIGS. 6 and 7 use a compressor 35A in the forcible delivering machine 35. By using the compressor 35A in the forcible delivering machine 35, it is possible to pressurize the mixed fluid to have an atmospheric pressure or more, thereby supplying the mixed fluid to the collecting chamber 5. In the separating apparatus, the partial pressure of the saturated vapor of the mixed liquid in a vapor phase can be set to be lower than the partial pressure of the saturated vapor under an atmospheric pressure and the atomized fine particle can be coagulated and collected more effectively in the collecting chamber 5.

For the compressor 35A, it is possible to use a compressor of a Lysholm compressor as a compressor of a piston type, a compressor of a rotary type or a compressor of a diaphragm type. It is preferable that a type capable of feeding the mixed liquid at a pressure of 0.2 to 1 MPa should be used for the compressor 35A.

In an apparatus for raising the pressure of the collecting chamber 5 by using the compressor 35A for the forcible delivering machine 35, a throttle valve 36 is coupled to the discharge side of the collecting chamber 5. In the case in which the flow rate of the mixed fluid supplied to the collecting chamber by the compressor is high, it is not always necessary to provide the throttle valve on the discharge side of the collecting chamber. The reason is that the compressor can supply a large amount of the mixed fluid to the collecting chamber, thereby setting the pressure of the collecting chamber to be equal to or higher than the atmospheric pressure in the case in which a passing resistance on the discharge side of the collecting chamber is high. The throttle valve can be coupled to the discharge side of the collecting chamber, thereby pressurizing the collecting chamber to have the atmospheric pressure or more efficiently. The throttle valve 36 increases the passing resistance of the mixed fluid discharged from the collecting chamber 35A, thereby raising the pressure of the collecting chamber 5. It is possible to use, for the throttle valve 36, a valve capable of regulating an opening to adjust the passing resistance of the mixed fluid, a piping obtained by raising the passing resistance of the mixed fluid with a thin tube such as a capillary tube or a valve obtained by filling a piping with a resistance material for raising the passing resistance of the mixed fluid. When the throttle valve 36 increases the passing resistance, the pressure of the collecting chamber 5 is raised.

Figure 17:
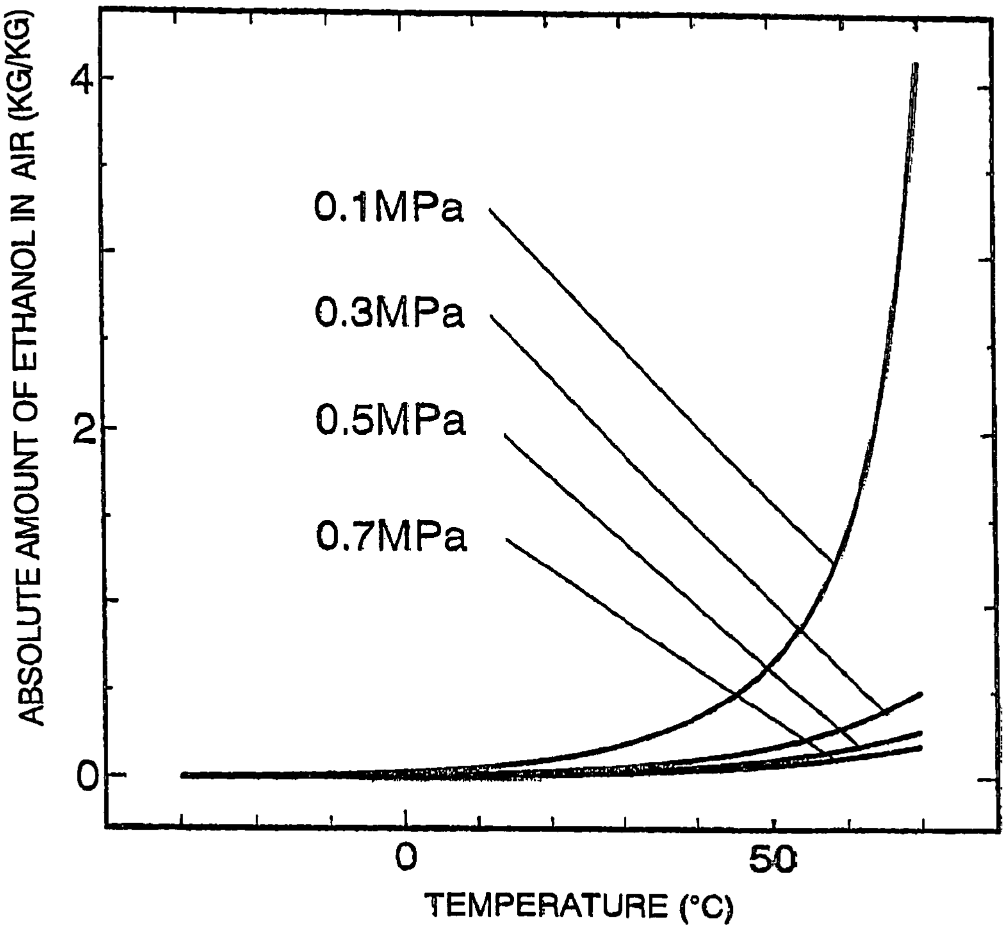
FIG. 17 is a graph showing the absolute amount of ethanol in the air under pressure.

FIG. 17 shows a state in which the amount of the ethanol of a mixed liquid contained in the air to be the mixed fluid is decreased when the collecting chamber 5 is pressurized to have an atmospheric pressure or more. As is apparent from the graph, in the air of the mixed fluid, the amount of the ethanol which can be contained in the state of a gas is increased when a temperature is raised. However, the amount of the ethanol which can be contained in the state of the gas is suddenly decreased when a pressure is raised. For example, when the pressure is raised to be 0.1 MPa to 0.5 MPa of an atmospheric pressure, the amount of the ethanol which can be contained in dry air at 30° C. is remarkably decreased to be approximately 1/5. When the maximum amount of the ethanol which can be contained in the state of the gas is decreased, a larger amount of the ethanol than the maximum amount of the ethanol is wholly brought into the state of an oversaturated atomized fine particle and can be thus collected efficiently. The ethanol contained in the state of the gas is coagulated and cannot be collected if it is not changed into the atomized fine particle. If an ultrasonic vibration atomizes the mixed liquid into the state of the atomized fine particle and the atomized fine particle is vaporized into the state of the gas, moreover, the atomized fine particle is coagulated and cannot be collected. For this reason, it is important to collect the mixed liquid changed into the atomized fine particle by the ultrasonic vibration in the state of the atomized fine particle without vaporization. Even if the atomized fine particle is vaporized, furthermore, it can be liquefied and collected again in the oversaturation state. In order to efficiently collect the mixed liquid, it is important to decrease the amount of the mixed liquid to be the atomized fine particle which is to be vaporized into the mixed fluid as greatly as possible. In the present invention, the mixed fluid containing the atomized fine particle is pressurized to have the atmospheric pressure or more to drop the partial pressure of the saturated vapor of the mixed liquid, and consequently, the mixed liquid contained in the mixed fluid is efficiently collected in the state of the atomized fine particle in place of the state of the gas. By cooling the mixed fluid, it is also possible to drop the partial pressure of the saturated vapor. However, a pressurizing method has a feature that the partial pressure of the saturated vapor can be efficiently dropped very easily by using a compressor with a small energy. By cooling and pressurizing the mixed fluid at the same time, furthermore, it is also possible to further drop the partial pressure of the saturated vapor of the mixed liquid, thereby collecting the mixed liquid more efficiently.

When the compressor 35A compresses the mixed fluid, the mixed fluid is adiabatically compressed to generate heat. When the mixed fluid passes through the throttle valve 36, moreover, it is adiabatically expanded and cooled. It is preferable that the mixed fluid supplied from the compressor 35A to the collecting chamber 5 should be cooled in order to efficiently collect the atomized fine particle. When the heat is generated, a collection efficiency is deteriorated. In order to lessen the drawback, the apparatus in FIG. 6 is provided with a heat exchanger 37 for exhaust heat for exchanging heat on the discharge side of the throttle valve 36 and the discharge side of the compressor 35A, that is, the inflow side of the collecting chamber 5. The heat exchanger 37 for exhaust heat cools the mixed fluid compressed adiabatically and heated by the compressor 35A with the mixed fluid expanded adiabatically and cooled on the discharge side of the throttle valve 36.

The heat exchanger 37 for exhaust heat circulates a refrigerant in a circulating pipe 38. The circulating pipe 38 has one of ends coupled thermally to the discharge side of the throttle valve 36 and the other end coupled thermally to the discharge side of the compressor 35A. The refrigerant circulated in the circulating pipe 38 is cooled at the discharge side of the throttle valve 36. The refrigerant cooled therein cools the discharge side of the compressor 35A. In the circulating pipe 38, a portion to be coupled thermally is set to have a double tube structure and the mixed fluid and the refrigerant are coupled thermally to each other, which is not shown.

Furthermore, the apparatus shown in FIG. 6 comprises a second heat exchanger 39 for exhaust heat for coupling the discharge side of the throttle valve 36 to a condenser 40 for cooling the heat exchanger 33 for cooling. The second heat exchanger 39 for exhaust heat has the same structure as that of the heat exchanger 37 for exhaust heat described above, and serves to cool the refrigerant on the discharge side of the throttle valve 36, to cool the condenser 40 with the cooled refrigerant, and to liquefy the refrigerant circulated in the condenser 40.

In the apparatuses shown in FIGS. 5 to 7, the atomizing chamber 4, the air separating machine 50 and the collecting chamber 5 are coupled through a circulating duct 30, thereby circulating the mixed fluid to the atomizing chamber 4 and the collecting chamber 5. Furthermore, the outside air is inhaled through an outside air supplying device 78 and is thus supplied to the atomizing chamber 4. An apparatus in which the outside air supplying device 78 supplies the outside air to the atomizing chamber 4 can efficiently atomize the mixed liquid of the atomizing chamber 4 by utilizing the thermal energy of the outside air. The thermal energy of the outside air inhaled through the outside air supplying device 7B efficiently atomizes the mixed liquid in the atomizing chamber 4 into the atomized fine particle, and furthermore, vaporizes the atomized fine particle efficiently. The reason is that the mixed liquid in the atomizing chamber 4 can raise the temperature of the air to be supplied, thereby enhancing an atomization efficiently. The outside air taken in through the outside air supplying device 78 has a thermal energy by itself. A device for vaporizing the atomized fine particle by effectively utilizing the thermal energy contained in the outside air efficiently atomizes the mixed liquid into the atomized fine particle by effectively utilizing the thermal energy of the outside air, and furthermore, vaporizes the atomized fine particle efficiently. Accordingly, this device can efficiently atomize the mixed liquid in the atomizing chamber 4 into the atomized fine particle, and furthermore, can efficiently vaporize the atomized fine particle without heating the air to be supplied to the atomizing chamber 4 by means of a heater, a burner or the like. The outside air supplying device 78 supplies, to the atomizing chamber 4, the air corresponding to the amount of the air to be discharged through the air separating machine 50. In other words, the amount of the air to be taken from the outside air supplying device 78 to the atomizing chamber 4 is separated from the mixed fluid and is discharged to an outside by means of the air separating machine 50.

Figure 18:
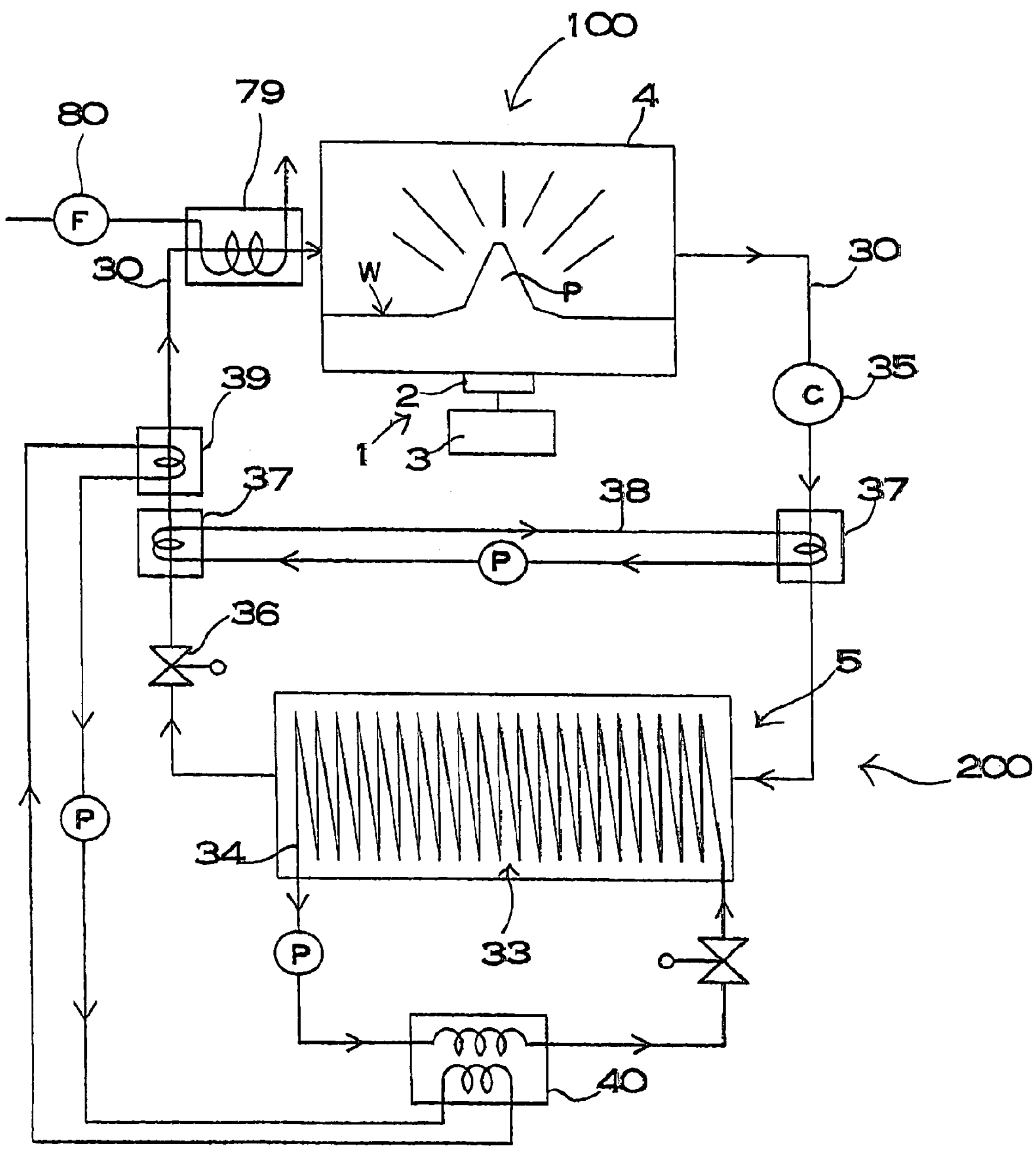
FIG. 18 is a schematic view showing a structure of an apparatus for separating a liquid according to a further example of the present invention.

An apparatus shown in FIG. 18 is not provided with the air separating machine but circulates the air separated from a hydrocarbon mixture contained in the mixed fluid to the atomizing chamber 4. The air circulated to the atomizing chamber 4 is heated by the outside air heat exchanger 79. The outside air heat exchanger 79 heats the air circulated to the atomizing chamber 4 with the thermal energy of the outside air. The outside air heat exchanger 79 fixes a large number of radiation fins (not shown) to a piping for causing the circulated air to pass therethrough, and sends the outside air to the radiation fins through a forcible blower fan 80, thereby heating the circulated air with the outside air.

In the apparatus shown in FIG. 4, the discharge side of the atomizing chamber 4, the air separating machine 50 and the supply side of the collecting chamber 5 are coupled through the circulating duct 30, and the discharge side of the collecting chamber 5 and the supply side of the atomizing chamber 4 are not coupled through the circulating duct 30. This apparatus can circulate the air separated through the air separating machine 50 to the atomizing chamber 4, thereby atomizing petroleum into the atomizing fine particle in the atomizing chamber 4 efficiently. The reason is that the air containing no petroleum is supplied to the atomizing chamber 4. Furthermore, this apparatus can heat the circulated air by the outside air heat exchanger 79, thereby atomizing the petroleum more efficiently. Moreover, this apparatus can also circulate, to the atomizing chamber 4, both the air separated from the hydrocarbon mixture through the air separating machine 50 and the air separated from the hydrocarbon mixture in the atomizing chamber 5 as shown in a chain line of FIG. 4.

The collecting chamber 5 shown in FIGS. 4 to 7 includes the heat exchanger 33 for cooling which serves to cool and condense the atomized fine particle. The heat exchanger 33 for cooling fixes a fin (not shown) to the heat exchange pipe 34. A refrigerant for cooling or cooling water is circulated to the heat exchange pipe 34, thereby cooling the heat exchanger 33 for cooling. The atomized fine particle which is obtained in the atomizing chamber 4 is partially vaporized and changed into the gas. However, the gas is cooled by the heat exchanger 33 for cooling in the collecting chamber 5, and is condensed, flocculated and collected. The atomized fine particle flowing into the collecting chamber 5 collides with the heat exchanger 33 for cooling or collides with each other and is greatly condensed, or collides with the fin of the heat exchanger 33 for cooling, is greatly condensed and is collected as the mixed liquid. The air obtained by condensing and collecting the atomized fine particle and the gas through the heat exchanger 33 for cooling is circulated into the atomizing chamber 4 again through the circulating duct 30.

Figure 19:
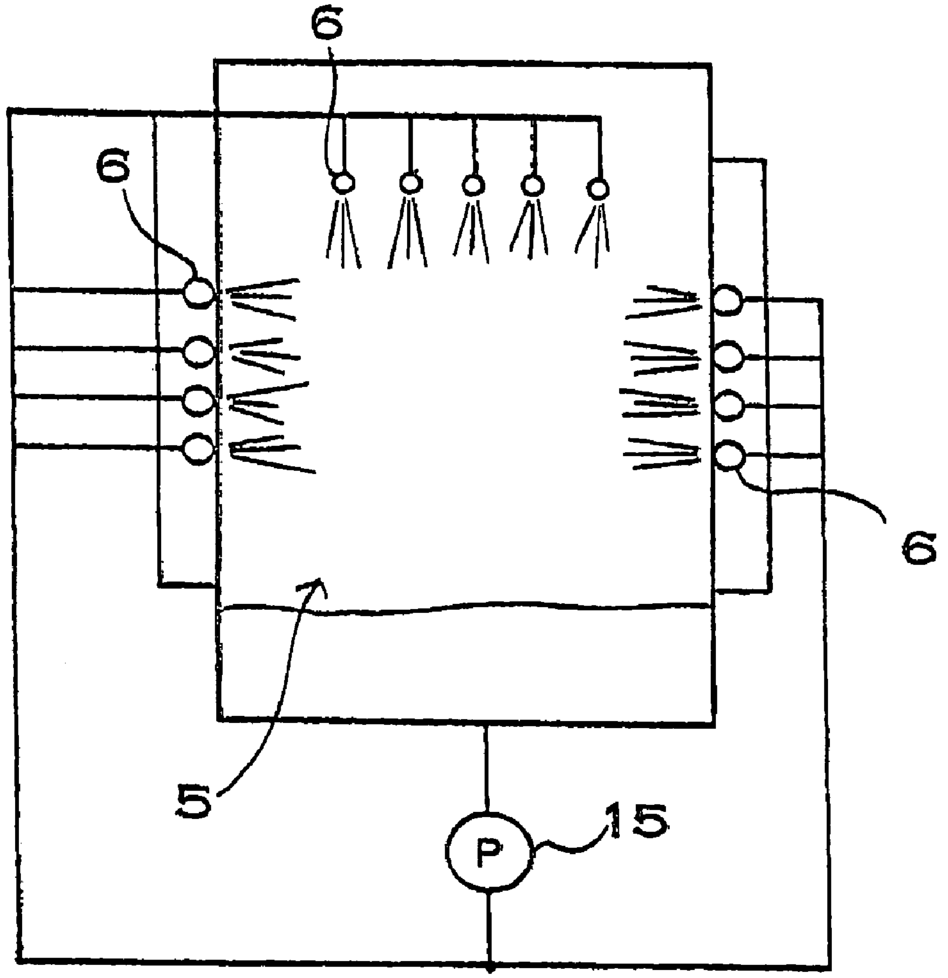
FIG. 19 is a schematic sectional view showing an example of a collecting chamber.

In order to collect the atomized fine particle in the collecting chamber 5 more quickly, the collecting chamber 5 in FIG. 19 includes a nozzle 6 for jetting the mixed liquid. The nozzle 6 is coupled to the bottom portion of the collecting chamber 5 through a circulating pump 15. The circulating pump 15 inhales the mixed liquid collected in the collecting chamber 5 and sprays the mixed liquid from the nozzle 6.

In the separating apparatus shown in the drawing, the nozzle 6 is provided in the upper part of the collecting chamber 5. The nozzle 6 in the upper part sprays the mixed liquid downward. The mixed liquid sprayed from the nozzle 6 is a sufficiently larger waterdrop as compared with the atomized fine particle which is atomized by the atomizing machine 1, and drops quickly in the collecting chamber 5 and collides with the atomized fine particle floating in the collecting chamber 5 during the dropping, and drops while collecting the atomized fine particle. Accordingly, it is possible to collect the atomized fine particle floating in the collecting chamber 5 efficiently and quickly.

While the separating apparatus shown in the drawing has the nozzle 6 provided in an upper part, it is also possible to dispose the nozzle in the lower part of the collecting chamber 5. The nozzle in the tower part sprays the mixed liquid upward. The nozzle sprays the mixed liquid at such a speed as to cause the mixed liquid to collide with the ceiling of the collecting chamber 5 or such a speed as to rise to the vicinity of the ceiling. The mixed liquid sprayed to rise to the vicinity of the ceiling changes a direction downward in the vicinity of the ceiling and thus drops. Therefore, the mixed liquid efficiently collects the atomized fine particle in contact with the atomized fine particle when it rises and drops.

Figure 20:
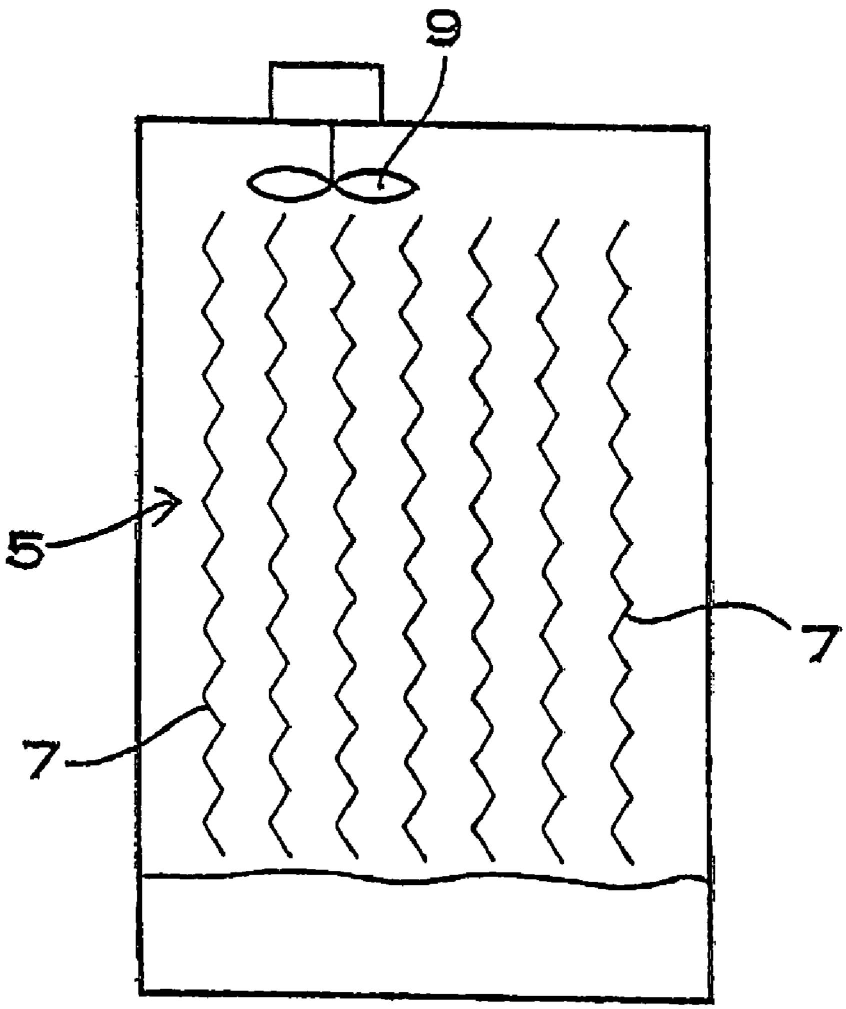
FIG. 20 is a schematic sectional view showing another example of the collecting chamber.

The collecting chamber 5 in FIG. 20 has a plurality of baffle plates 7 provided therein. The baffle plate 7 forms a clearance capable of causing the atomized fine particle to pass therethrough together with the adjacent baffle plate 7 and is disposed in a vertical posture. The vertical baffle plate 7 can cause the atomized fine particle to collide with a surface and to cause the sticking mixed liquid to naturally flow down so as to be collected. The baffle plate 7 in FIG. 20 has a concavo-convex surface and can cause the atomized fine particle to come in contact therewith so as to be collected more efficiently.

Furthermore, the collecting chamber 5 in FIG. 20 is provided with a fan 9 for forcibly sending and stirring the atomized fine particle. The fan 9 stirs the atomized fine particle in the collecting chamber 5. The atomized fine particles which are stirred collide with each other and are flocculated or collide with the surface of the baffle plate 7 and are flocculated. The flocculating atomized fine particle drops quickly and is thus collected. The fan 9 in FIG. 20 sends and circulates the atomized fine particle in the collecting chamber 5 downward.

Figure 21:
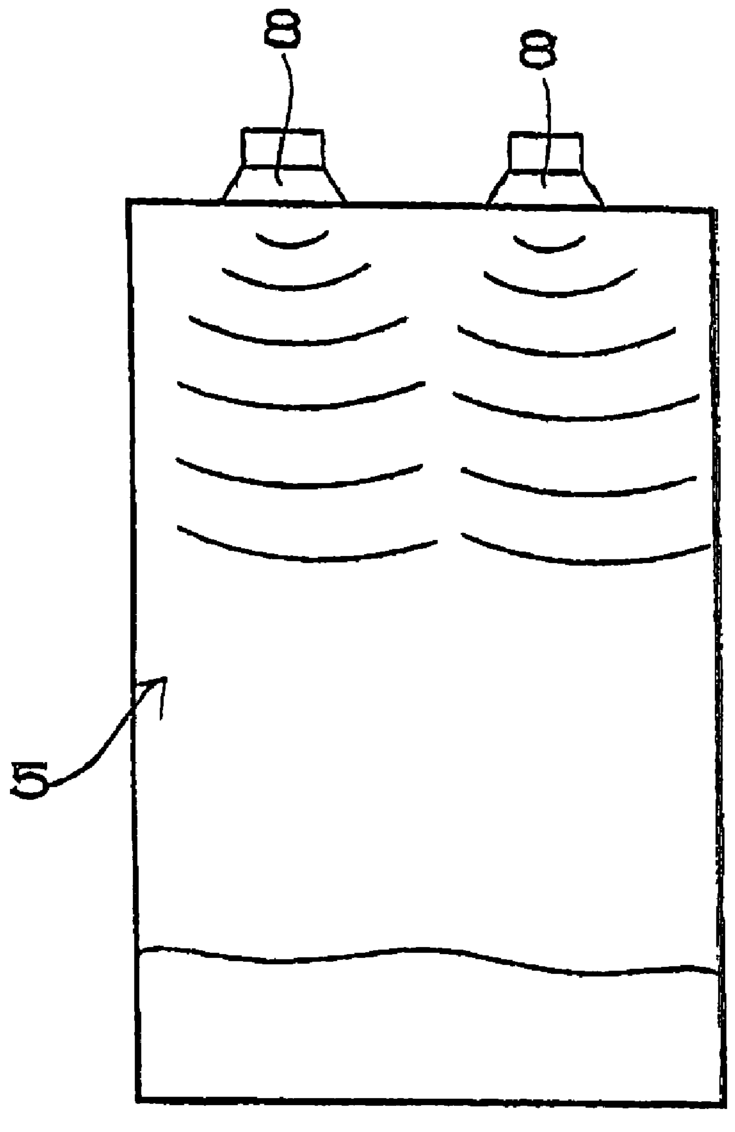
FIG. 21 is a schematic sectional view showing a further example of the collecting chamber.

The collecting chamber 5 in FIG. 21 is provided with an atomized fine particle vibrator 8 for increasing a probability that the atomized fine particles might be vibrated to collide with each other. The atomized particle vibrator 8 includes an electrical vibration-mechanical vibration converter for vibrating a gas in the collecting chamber 5, and a vibration power supply for driving the electrical vibration-mechanical vibration converter. The electrical vibration-mechanical vibration converter is a speaker for radiating a sound having an audible frequency, an ultrasonic vibrator for radiating a higher ultrasonic wave than the audible frequency, or the like. In order for the electrical vibration-mechanical vibration converter to vibrate the atomized fine particle efficiently, a vibration radiated from the electrical vibration-mechanical vibration converter is resonated in the collecting chamber 5. In order to implement the resonation, the electrical vibration-mechanical vibration converter carry out a vibration at a frequency which is resonated in the collecting chamber 5. In other words, the collecting chamber 5 is designed to take such a configuration as to be resonated with the vibration radiated from the electrical vibration-mechanical vibration converter.

The ultrasonic wave has a high frequency which exceeds a human audible frequency, and therefore, people cannot hear the ultrasonic wave. For this reason, the atomized fine particle vibrator 8 for radiating the ultrasonic wave violently vibrates a gas in the collecting chamber 5, that is, increases the output of the electrical vibration-mechanical vibration converter very greatly so that the people are not influenced by the damage of a sound. For this reason, the ultrasonic wave has a feature that the atomized fine particles can be violently vibrated to efficiently collide with each other, and can be thus collected quickly.

In the separating apparatus described above, the device for efficiently flocculating the atomized fine particle is provided in the collecting chamber 5. Therefore, it is possible to flocculate the atomized fine particle more quickly, thereby obtaining a mixed liquid having a high concentration. Furthermore, the separating apparatus according to the present invention can include all of the nozzle for spraying the mixed liquid, the fan for stirring the atomized fine particle, and the vibrator for vibrating the atomized fine particle in the collecting chamber, thereby flocculating the atomized fine particle most efficiently, which is not shown. Moreover, the separating apparatus can include two devices for flocculating the atomized fine particle, thereby flocculating the atomized fine particle efficiently.

In the present invention, furthermore, the mixed liquid can be set to be petroleum, and the petroleum can be atomized into an atomized fine particle by an ultrasonic vibration and can be thus separated into a hydrocarbon mixture having different component contents. The petroleum to be the mixed liquid can be atomized into the atomized fine particle by the ultrasonic vibration and can be thus separated into the hydrocarbon mixture having different component contents for the following reason. More specifically, the petroleum contains a plurality of hydrocarbons having different numbers of carbons (n), and the hydrocarbons are atomized into the atomized fine particles depending on the number of the carbons (n) or the atomized components are flocculated and collected in different conditions. For example, the petroleum contains a plurality of hydrocarbons having different numbers of carbons (n). When the petroleum is atomized into the atomized fine particle by the ultrasonic vibration, however, the hydrocarbon having a small number of the carbons (n) is easily atomized into the atomized fine particle and the hydrocarbon having a large number of the carbons (n) is atomized into the atomized fine particle with difficulty.

Figure 22:
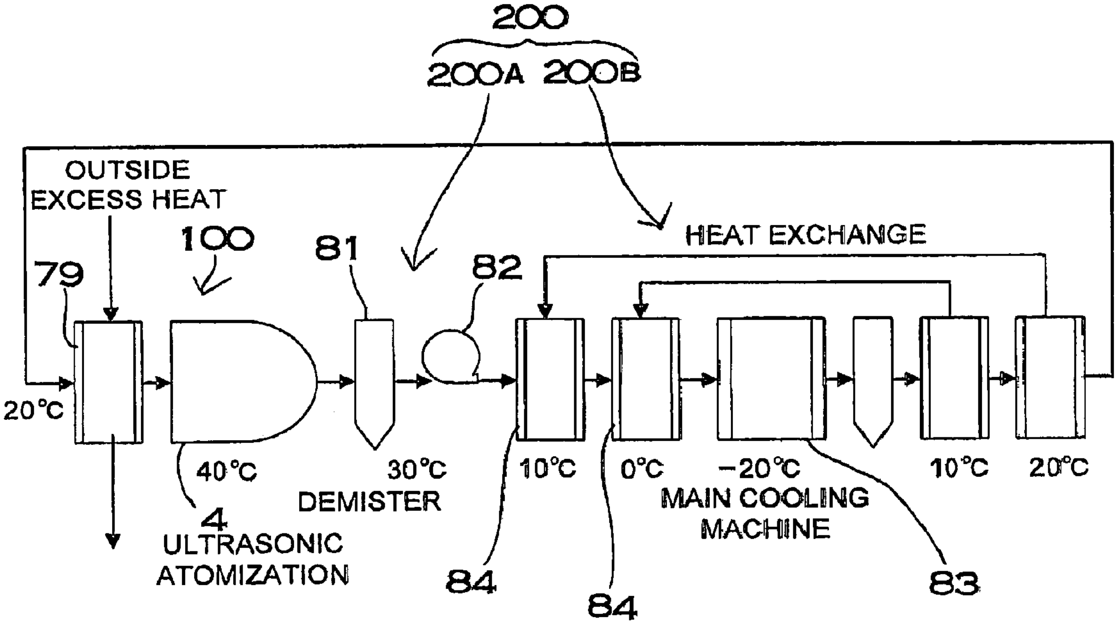
FIG. 22 is a schematic view showing a structure of an apparatus for separating a liquid according to a further example of the present invention.

FIG. 22 shows an apparatus for collecting a mixed fluid atomized into an atomized fine particle in a multistage. The apparatus atomizes the mixed fluid into the atomized fine particle by an ultrasonic vibration in a state in which the petroleum is heated to 40° C. The air supplied to the atomizing chamber 4 is heated by the outside air heat exchanger 79. The outside air heat exchanger 79 heats the air with a thermal energy contained in the outside air and supplies the heated air to the atomizing chamber 4. The atomized fine particle is mixed with the air through a carrier gas and is changed into the mixed fluid. Any of the hydrocarbon mixtures contained in the mixed fluid which is not vaporized but left and has a large particle size is collected in a demister 81 to be a first collecting device 200A. The demister 81 to be the first collecting device 200A may be at least one of a chevron, a punching plate, a mesh, a demister, a cyclone, an electrostatic field collecting device, a filter, a scrubber, an atomized fine particle collecting device using an ultrasonic vibration, a bundle of capillaries and a honeycomb or their combination.

The air to be the carrier gas obtained by partially separating the hydrocarbon mixture in the demister 81 to be the first collecting device 200A is supplied to a second collecting device 200B to be a next step through a blower 82. The blower 82 has a suction side coupled to the atomizing chamber 4 and a discharge side coupled to the second collecting device 200B in a next stage. In this apparatus, the pressure of the atomizing chamber 4 is reduced to be lower than an atmospheric pressure through the blower 82, and the pressure of the second collecting device 200B is raised to be higher than the atmospheric pressure. The atomizing chamber 4 having the pressure reduced promotes the vaporization and atomization of the petroleum. In the second collecting device 200B thus pressurized, the relative vapor pressure of the petroleum is reduced to promote a condensation. The collecting device 200 cools an atomized vapor phase which is vaporized or changed into an aerosol, and separates a hydrocarbon mixture from the air and collects the hydrocarbon mixture. In the collecting device 200 in this drawing, a heat exchanger 84 for collection is coupled to the inflow and discharge sides of a main cooling machine 83 in a multistage. By circulating a refrigerant in order of a short distance from the main cooling machine 83, it is possible to move the heat of the entering mixed fluid to a vapor phase at the outlet of the main cooling machine 83 and to move a cold at the outlet of the main cooling machine 83 to a vapor phase at the inlet of the collecting portion to be the outlet of the atomizing portion. Thus, it is possible to constitute a process for separating the petroleum by a one-pass method. With this structure, it is possible to effectively utilize the heat of the air on the outside of the apparatus. The collecting device 200 can collect the hydrocarbon mixtures in descending order of the number of the carbons (n) from the atomizing chamber 4 to the main cooling machine 83.

Figure 23:
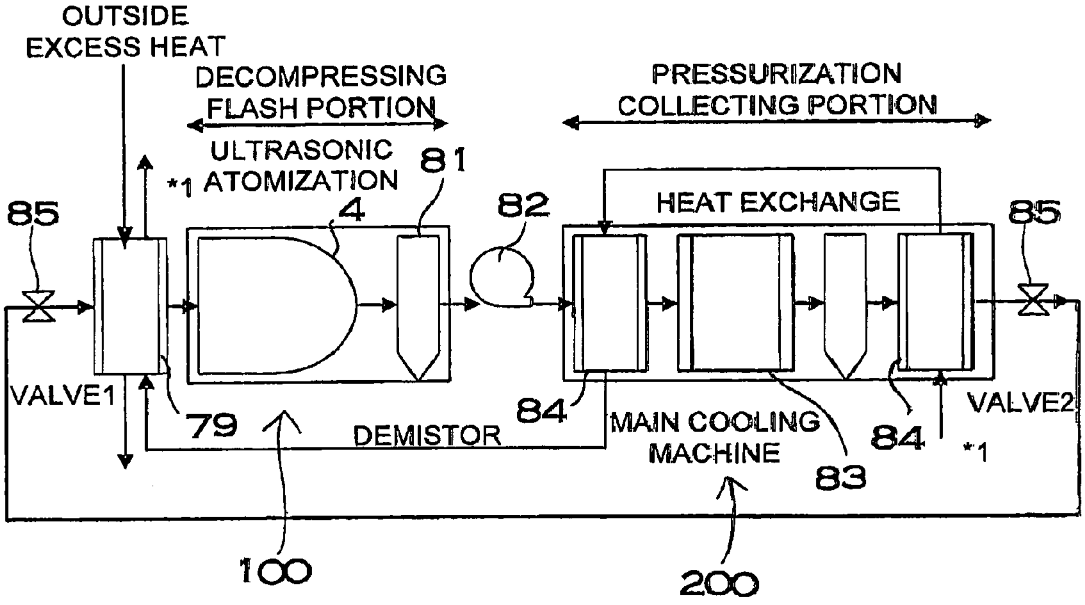
FIG. 23 is a schematic view showing a structure of an apparatus for separating a liquid according to a further example of the present invention.

Furthermore, FIG. 23 shows an apparatus for separating petroleum in which the atomizing chamber 4 is decompressed and the collecting device 200 is pressurized. In this apparatus, the atomizing chamber 4 is decompressed to promote the atomization of the petroleum, and a condensation is efficiently carried out in the collecting device 200 to promote the collection in the same manner as the apparatus shown in FIG. 22. A mixed fluid supplied to the collecting device 200 is adiabatically compressed and generates heat. The generated heat is collected by a heat exchanger and is supplied to the air to be a carrier gas which is to be fed to the atomizing chamber 4, thereby raising a temperature. The air of the carrier gas to be supplied to the atomizing chamber 4 can raise the temperature, thereby enhancing the atomization efficiency of the petroleum. The reason is that it is possible to raise the temperature of the carrier gas, thereby promoting the atomization itself in the atomization carried out by the ultrasonic vibration. The air of the carrier gas supplied to the atomizing chamber 4 which is decompressed is adiabatically expanded so that the temperature is reduced. For this reason, it is desirable that the adiabatic compression heat of the collecting device 200 should be moved as a heat source for raising the temperature of the air.

The mixed fluid containing the atomized fine particle of the atomized petroleum is caused to pass through the demister 81 to be the first collecting device. The demister 81 serves to cause the atomized fine particle having a comparatively large particle size which is neither vaporized nor changed into an aerosol to mechanically come in contact therewith, and to flocculate and collect the same atomized fine particle. In the apparatus shown in this drawing, the collecting device 200 including the heat exchanger 84 in a multistage is coupled to interpose the main cooling machine 83 between the inflow and discharge sides of the main cooling machine 83 in the same manner as the apparatus shown in FIG. 22. The heat exchanger 84 in a multistage can be thermally moved, thereby saving an energy to operate the apparatus. More specifically, the cold of a vapor phase at the outlet of the main cooling machine 83 is given to the inlet of a pressurizing and collecting portion. The output side of the collecting device 200 is coupled to the atomizing chamber 4 through a control valve 85. The control valves 85 and 85 to be used can be of a spring type but are not restricted thereto. The control valve of the spring type is opened when a pressure is raised to reach a ser pressure. While it is desirable that a pump for moving the carrier gas should be of a diaphragm type or a piston type, and the pump is not restricted thereto.

It is also possible to collect, in an adsorbing device (not shown), the hydrocarbon mixture contained in the carrier gas which finally goes out of the collecting device. The adsorbing device includes an adsorbing tower filled with active carbon, zeolite, silica, a ceramics porous body or the like. The adsorbing device adsorbs and collects a dilute hydrocarbon mixture contained in the carrier gas. While the adsorbing device heats and removes and/or attaches the hydrocarbon mixture which is adsorbed, it is desirable that the same device should be of a swing type. The adsorbing device of the swing type uses a two-tower method, and the removal and/or the attachment and the collection are carried out by one of the adsorbing towers while the other adsorbing tower carries out the adsorption. In the adsorbing device, the adsorbing tower may be of a rotor type and a honeycomb is caused to carry the active carbon, the zeolite, the silica and the ceramics porous body, and they are adsorbed and collected on either side of the center of the rotation of a rotor, and are heated, removed and/or attached and collected on the other side.

Figure 24:
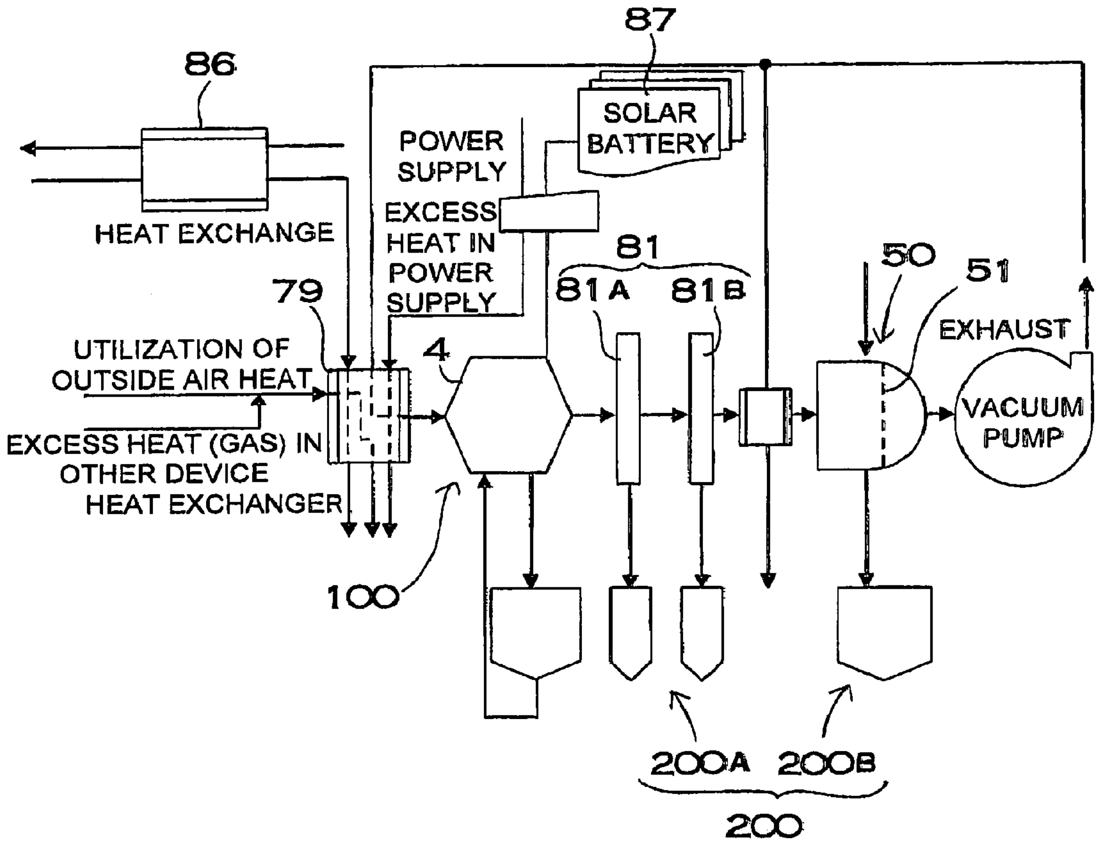
FIG. 24 is a schematic view showing a structure of an apparatus for separating a liquid according to a further example of the present invention.

FIG. 24 shows an apparatus for separating petroleum which is of a type using a molecular sieve film utilizing an air separating film of a zeolite film. This apparatus comprises the air separating machine 50 for separating a hydrocarbon mixture from a mixed fluid. The air separating machine 50 includes a zeolite film as the air transmitting film 51. The zeolite film of the air transmitting film 51 has a thin hole which is smaller than the molecular diameter of the hydrocarbon mixture constituting the petroleum and is larger than the molecular diameters of nitrogen and oxygen which constitute the air to be a carrier gas to be introduced in an atomized portion. More specifically, the zeolite film is an air transmitting film through which the carrier gas can be transmitted and the hydrocarbon mixture cannot be transmitted. For the air transmitting film, it is also possible to use the silica, the ceramics porous body and the like in place of the zeolite film.

In the apparatus, the outside air heat exchanger 79 is coupled to the inflow side of the atomizing chamber 4. The outside air heat exchanger 79 heats the air to be the carrier gas which is to be supplied to the atomizing chamber 4 by effectively utilizing excessive heat on an outside. In the apparatus shown in the drawing, furthermore, an excess heat exchanger 86 is coupled to the outside air heat exchanger 79. The excess heat exchanger 86 heats the outside air by effectively utilizing excessive heat generated from another device. The outside air heated by the excess heat exchanger 86 heats the air to be the carrier gas which is to be supplied to the atomizing chamber 4 through the outside air heat exchanger 79. The air to be the carrier gas heated by the outside air heat exchanger 79 is supplied to the atomizing chamber 4 so that the atomizing chamber 4 atomizes the petroleum into the atomized fine particle. The atomized fine particle thus obtained is diffused into the carrier gas so as to be a mixed fluid. In this state, the atomized fine particles are partially vaporized or are changed into an aerosol, and are moved toward the collecting device 200. The atomized fine particle which is contained in the mixed fluid and has a comparatively large particle size is collected in mechanical contact by means of the demister 81 to be the first collecting device 200A. In the apparatus shown in the drawing, the demister 81 to be the first collecting device 200A is coupled in two stages. In the demister 81A in a first stage, a hydrocarbon mixture having a large number of the carbons (n) is collected as compared with the demister 81B in a second stage. The mixed fluid passing through the demister 81 is supplied to the air separating machine 50 having a molecular sieving effect, that is, the second collecting device 200B. The air separating machine 50 separates only the air from the mixed fluid through the zeolite film of the air transmitting film 51 and discharges the air to the outside. The hydrocarbon mixture which is not transmitted through the zeolite film of the air transmitting film 51 is separated from the air through the air separating machine 50 and is thus collected. In the air separating machine 50, a primary passage side may be pressurized and cooled.

Furthermore, the separating apparatus shown in the drawing uses, as a power supply, a solar battery 87, a fuel cell or a power generated by a wind power. This apparatus does not use a boiler to carry out driving differently from a conventional distilling apparatus. Therefore, it is possible to eliminate the discharge nitrogen oxides, sulfur oxides, a floating particle substance or a greenhouse gas. According to this apparatus, moreover, equipment for taking a countermeasure against these toxic substances is not required for each oil refinery. Therefore, it is also possible to obtain the effect of reducing a cost from a total point of view in our country. It is preferable to take a countermeasure against a large scale greenhouse substance or toxic substance such as a thermal power plant, an atomic power plant or the like. Consequently, it is possible to obtain the merit of scale for taking a countermeasure against an environment. In an ultrasonic oscillating circuit, moreover, heat is generated in a rate of several tens %. The heat can be collected to be effectively utilized by raising the temperature of the carrier gas to be supplied to the atomizing chamber 4 or raising the temperature of the petroleum in the atomizing chamber 4.

Figure 25:
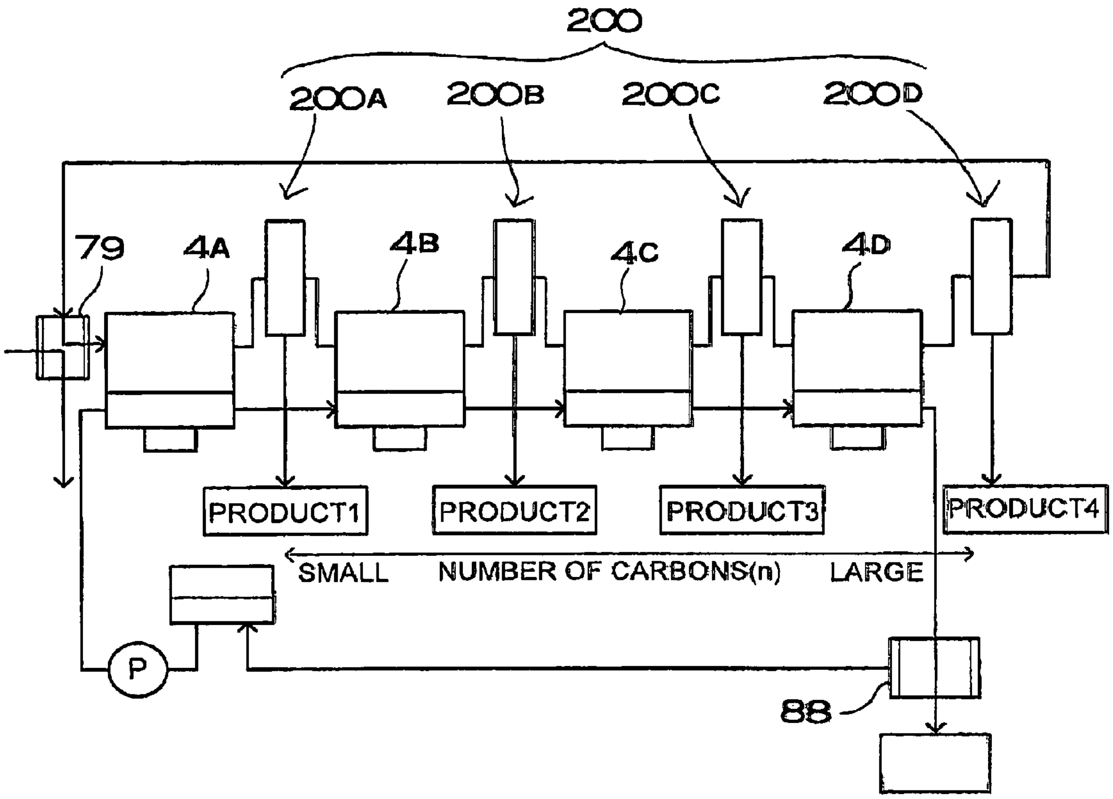
FIG. 25 is a schematic view showing a structure of an apparatus for separating a liquid according to a further example of the present invention.

In an apparatus for separating the petroleum shown in FIG. 25, a plurality of atomizing chambers 4 is coupled in series. In the apparatus shown in this drawing, the atomizing chambers 4 and the collecting devices 200 are coupled in series in four stages, respectively. The petroleum is moved to the first, second, third and fourth atomizing chambers 4 in order. When the petroleum is moved, a hydrocarbon mixture having a small number of the carbons (n) is sequentially separated as an atomized fine particle from the petroleum in the atomizing chamber 4. Accordingly, the petroleum of the atomizing chamber 4 in a former stage has a higher content of the hydrocarbon mixture having the small number of the carbons (n) as compared with the petroleum of the atomizing chamber 4 in a latter stage. The temperature of the petroleum in the atomizing chamber 4 is set to be lower in the former stage than the latter stage. The petroleum of the atomizing chamber 4 in the latter stage has a larger content of the hydrocarbon mixture having a large number of the carbons (n) as compared with the petroleum of the atomizing chamber 4 in the former stage. For this reason, the temperature of the petroleum is gradually raised to increase the efficiency of the atomization into the atomized fine particle. By reducing the temperature of the petroleum of the atomizing chamber 4 in the former stage, moreover, it is possible to separate the petroleum having a large content of the hydrocarbon mixture having a small number of the carbons (n) in the atomizing chamber 4 and the collecting device 200 in the former stage. The collecting device 200 cools the mixed fluid, thereby separating, from the air, the hydrocarbon mixture contained in the mixed fluid.

The separating apparatus in this drawing supplies a petroleum material at an ordinary temperature to the first atomizing chamber 4A. The first atomizing chamber 4A sets the temperature of the petroleum to be the lowest as compared with the temperature of the petroleum in each of the other atomizing chambers 4, and carries out an atomization into an atomized fine particle by an ultrasonic vibration. The mixed fluid containing the atomized fine particle has a large content of the hydrocarbon mixture having the small number of the carbons (n). The petroleum having the large content of the hydrocarbon mixture having the small number of the carbons (n) is separated from the air and is collected in the first collecting device 200A. The residual petroleum from which the petroleum having the large content of the hydrocarbon mixture having the small number of the carbons (n) is separated in the first atomizing chamber 4A is supplied to the second atomizing chamber 4B. The petroleum in the second atomizing chamber 4B has a large content of the hydrocarbon mixture having a larger number of the carbons (n) than that of the petroleum in the first atomizing chamber 4A. For this reason, the petroleum in the second atomizing chamber 4B is heated to have a higher temperature than the petroleum in the first atomizing chamber 4A. In the second atomizing chamber 4B, the temperature of the petroleum is raised, thereby generating an atomized fine particle by an ultrasonic vibration. The atomized fine particle generated in the second atomizing chamber 4B has a high content ratio of the hydrocarbon mixture having a larger number of the carbons (n) as compared with the atomized fine particle generated in the first atomizing chamber 4A. The mixed fluid passing through the first collecting device 200A is supplied to the second atomizing chamber 4B. The mixed fluid generated in the second atomizing chamber 4B is supplied to the second collecting device 200B. The second collecting device 200B collects the atomized fine particle generated in the second atomizing chamber 48. A part of the atomized fine particles generated in the first atomizing chamber 4A pass through the first collecting device 200A and are collected in the second collecting device 200B. The hydrocarbon mixture to be collected in the second collecting device 200B becomes petroleum having a large content of the hydrocarbon mixture having a larger number of the carbons (n) as compared with the hydrocarbon mixture to be collected in the first collecting device 200A. The residual petroleum from which the hydrocarbon mixture is separated in the second atomizing chamber 4B is supplied to the third atomizing chamber 4C. In the same manner, the residual petroleum from which the hydrocarbon mixture is separated in the third atomizing chamber 4C is supplied to the fourth atomizing chamber 4D. The mixed fluid passes through the first collecting device 200A, the second collecting device 200B, the third collecting device 200C, and the fourth collecting device 200D, and the petroleum having a large content of the hydrocarbon mixture having a large number of the hydrocarbons (n) is gradually separated and collected in the first to fourth collecting devices 200. As described above, it is possible to gradually raise the temperature of the petroleum in order, thereby separating the petroleum having a large content of the hydrocarbon mixture having a large number of the hydrocarbons (n) gradually.

In the apparatus shown in the drawing, the heat of the residual oil left finally is collected in a residual oil heat exchanger 88. In the examples described above, the petroleum in the first atomizing chamber 4A is not heated but can also be heated. Moreover, it is possible to insulate the outside of the atomizing chamber 4, thereby reducing the use of an energy in the whole apparatus as greatly as possible. In the apparatuses described above, the petroleum is separated in the contents of the hydrocarbon mixtures having different numbers of the carbons (n). Therefore, the apparatuses are suitable for separating a crude oil into a light oil, kerosene, naphtha or the like.

Tables 1 to 3 show components before and after a separation in gasoline separated by the separating method according to the present invention. This test was carried out by putting gasoline on the market in a vessel, and irradiating an ultrasonic wave of 2.4 MHz and 16 W from below a liquid surface to atomize petroleum into an atomized fine particle at an initial temperature of 28° C., thereby measuring the components of the petroleum before and after the ultrasonic atomization.

In the separating method, 20 litters/minute of air is introduced as a carrier gas into the atomizing surface of the atomizing chamber 4, and the temperature of the introduced air is set to be 23° C. A time required for the atomization is set to be 15 minutes. For a sulfur portion, a microcurrent titration type oxidation process defined in JIS K 2541-2 is used. PONA and a hydrocarbon component in the gasoline are subjected to a total component test by a gas chromatography process defined in the JIS K 2536-2, and an addition is carried out for each carbon chain length and type.

TABLE 1

| Carbon chain length before atomizing treatment | | Paraffin | Olefin | Naphthene | Aromatic |
|---|---|---|---|---|---|
| 3 | V/V % | 0.1 | 0.0 | 0.0 | 0.0 |
| 4 | V/V % | 3.7 | 1.8 | 0.0 | 0.0 |
| 5 | V/V % | 15.1 | 4.4 | 0.3 | 0.0 |
| 6 | V/V % | 13.7 | 2.7 | 1.1 | 0.3 |
| 7 | V/V % | 8.1 | 3.0 | 1.7 | B.7 |
| 8 | V/V % | 5.0 | 1.7 | 1.3 | 3.5 |
| 9 | V/V % | 1.8 | 0.8 | 0.9 | 10.1 |
| 10 | V/V % | 1.5 | 0.5 | 0.2 | 4.5 |
| 11 | V/V % | 0.9 | 0.4 | 0.1 | 1.4 |
| 12 | V/V % | 0.4 | 0.1 | 0.0 | 0.2 |
| 13 | V/V % | 0.0 | 0.0 | 0.0 | 0.0 |
| Total | | 50.3 | 15.4 | 5.6 | 28.7 |
| Sulfur portion | ppm | | 73.0 | | |

TABLE 2

| Carbon chain length after atomizing treatment | | Paraffin | Olefin | Naphthene | Aromatic |
|---|---|---|---|---|---|
| 3 | V/V % | 0.0 | 0.0 | 0.0 | 0.0 |
| 4 | V/V % | 0.1 | 0.1 | 0.0 | 0.0 |
| 5 | V/V % | 5.5 | 2.0 | 0.2 | 0.0 |
| 6 | V/V % | 11.9 | 2.6 | 1.1 | 0.3 |
| 7 | V/V % | 9.6 | 3.6 | 2.1 | 11.2 |
| 8 | V/V % | 6.7 | 2.3 | 1.8 | 4.9 |
| 9 | V/V % | 2.5 | 1.0 | 1.2 | 14.5 |
| 10 | V/V % | 2.0 | 0.7 | 0.3 | 6.5 |
| 11 | V/V % | 1.2 | 0.5 | 0.1 | 2.2 |

TABLE 2-continued

| Carbon chain length after atomizing treatment | | Paraffin | Olefin | Naphthene | Aromatic |
|---|---|---|---|---|---|
| 12 | V/V % | 0.6 | 0.2 | 0.0 | 0.4 |
| 13 | V/V % | 0.1 | 0.0 | 0.0 | 0.0 |
| Total | | 40.2 | 13.0 | 6.8 | 40.0 |
| Sulfur portion | ppm | | | 97.0 | |

TABLE 3

| Concentration in vapor phase in atomizing portion C | | Paraffin | Olefin | Naphthene | Aromatic |
|---|---|---|---|---|---|
| 3 | V/V % | 0.3 | 0.0 | 0.0 | 0.0 |
| 4 | V/V % | 11.7 | 5.6 | 0.0 | 0.0 |
| 5 | V/V % | 36.4 | 9.7 | 0.5 | 0.0 |
| 6 | V/V % | 17.7 | 2.9 | 1.1 | 0.3 |
| 7 | V/V % | 4.8 | 1.7 | 0.8 | 3.1 |
| 8 | V/V % | 1.2 | 0.4 | 0.2 | 0.4 |
| 9 | V/V % | 0.2 | 0.4 | 0.2 | 0.3 |
| 10 | V/V % | 0.4 | 0.1 | 0.0 | 0.1 |
| 11 | V/V % | 0.2 | 0.2 | 0.1 | −0.4 |
| 12 | V/V % | 0.0 | −0.1 | 0.0 | −0.2 |
| 13 | V/V % | −0.2 | 0.0 | 0.0 | 0.0 |
| Total | | 72.7 | 20.7 | 2.9 | 3.6 |
| Sulfur portion | ppm | | | 19.7 | |

"Data before an atomizing treatment" and "data after the atomizing treatment" indicate the result of the measurement for the gasoline before and after the ultrasonic atomizing treatment. "Data on the concentration in the vapor phase in the atomizing portion" is obtained by a calculation based on a material balance depending on the weight and composition of the gasoline before and after the ultrasonic atomization. At this time, it can be supposed that cracking is rarely generated due to a cavitation in consideration of the conditions of the generation of an ultrasonic wave. For this reason, the depolymerization of a petroleum component is not caused.

Figure 26:
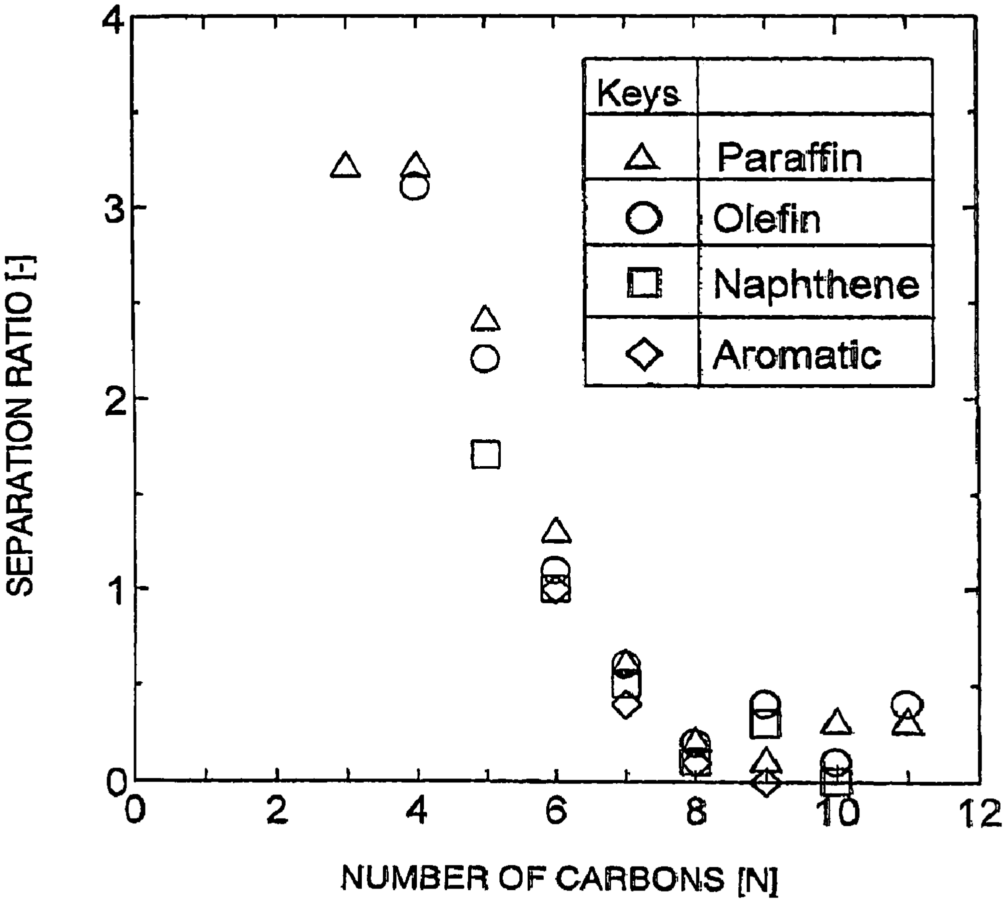
FIG. 26 is a chart showing the separation ratio of each component concentration of each carbon chain length in the vapor phase of an atomizing portion before an atomizing treatment.

FIG. 26 shows a change ratio of each component concentration of each carbon chain length in the "concentration in the vapor phase in the atomizing portion" to the concentration of each component of each carbon chain length in "before the atomizing treatment", that is, a separation ratio. It is apparent that a ratio of an original petroleum component remaining in a solution is equal to a ratio of a distribution in a vapor phase when a separation degree is 1, the component is easily moved as an atomized fine particle to a mixed fluid when the separation degree exceeds 1, and the component is easily accumulated on the residual petroleum side when the separation degree is equal to or lower than 1. As is apparent from this drawing, the component having a smaller number of the carbons (n) and a smaller carbon chain length is easily moved as the atomized fine particle to the mixed fluid.

In comparison of the component compositions in "the concentration in the vapor phase in the atomizing portion" and "before the atomizing treatment", moreover, the rates of paraffins and olefins in the vapor phase are increased and the concentrations of the naphthenes and aromatics in the residual oil are increased. The separating method according to the present invention can greatly change the composition of the petroleum as described above. Moreover, a consumed energy was measured. As a result, also in case of a gasoline separation test, the total value of a vibration energy (16 J/s) of an ultrasonic wave and a vapor-phase enthalpy decrease (3.4 J/s) is lower than a vaporization energy (52 J/s) of the gasoline so that the ultrasonic atomizing separation of the gasoline can be carried out by energy saving.

In a comparison of the concentrations of sulfur in "before the atomizing treatment" and "the concentration in the vapor phase in the atomization", simultaneously, it is apparent that they are reduced to be approximately ⅓. This implies that the concentration of the sulfur in the gasoline can be reduced to be 10 ppm or less by the atomizing treatment in two stages.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims. This application is based on Application No. 2004-234,904 filed in Japan on Aug. 11, 2004, the content of which is incorporated hereinto by reference.

What is claimed is:

1. A separating apparatus for separating liquids having different component contents from a mixed liquid the separating apparatus comprising:

an atomizing device for ultrasonically vibrating the mixed liquid and atomizing the mixed liquid into atomized fine particles, thereby obtaining a mixed fluid of the atomized fine particles and air;

a collecting device for separating the air from the atomized mixed fluid obtained in the atomizing device and collecting an atomized component; and an outside thermal energy supplying device for supplying a thermal energy of outside air to a surface of the mixed liquid to be atomized by the ultrasonic vibration by exchanging heat between the outside air and the air internally circulated via the atomizing device, and the surface of the mixed liquid to which the thermal energy of the outside air is supplied by the outside thermal energy supplying device is ultrasonically vibrated to atomize the mixed liquid, wherein the mixed liquid is atomized into the atomized fine particles to obtain the atomized mixed fluid in the atomizing device, and the atomized fine particles are separated in the collecting device from the mixed fluid into liquids having different component contents.

2. The separating apparatus according to claim 1, wherein the outside thermal energy supplying device is an outside air heat exchanger for heating a carrier gas to be supplied to the surface of the liquid to be atomized by the ultrasonic vibration, the carrier gas heated by the outside air heat exchanger is supplied to the atomizing device, and the atomizing device atomizes the liquid by the ultrasonic vibration while supplying the carrier gas heated with the thermal energy of the outside air to the surface of the liquid.

3. The separating apparatus according to claim 2, wherein the outside air heat exchanger heats the carrier gas containing the air separated from the mixed fluid and supplies the heated carrier gas to the atomizing device.

4. The separating apparatus according to claim 2, further comprising an air separating machine for separating air from the mixed fluid containing the atomized fine particles and the air, wherein the outside air heat exchanger heats the carrier gas containing the air separated from the mixed fluid by the air separating machine and the outside air heat exchanger supplies the heated carrier gas to the atomizing device.

5. The separating apparatus according to claim 4, wherein:

the air separating machine is provided between the discharge side of the atomizing device and the supply side of the collecting device; and the amount of the air in the mixed fluid supplied to the collecting device is less than the amount of air in the mixed fluid discharged from the atomizing device.

6. The separating apparatus according to claim 1, wherein the outside air thermal energy supplying device is an outside air supplying device for supplying outside air to the surface of the liquid to be atomized by the ultrasonic vibration, and the outside air supplying device supplies the outside air to the atomizing device, and the atomizing device atomizes the liquid by the ultrasonic vibration while supplying the thermal energy of the outside air to the surface of the liquid.

7. The separating apparatus according to claim 1, wherein the mixed liquid to be supplied to the atomizing device is any of a crude oil, petroleum, a volatile oil, a light oil, gasoline, naphtha, kerosene, a heavy oil, a substance obtained by carrying out a cracking treatment over them with a catalyst, and their mixture.

8. The separating apparatus according to claim 7, wherein the mixed liquid is separated into hydrocarbon mixtures having different numbers of carbons (n).

9. The separating apparatus according to claim 1, wherein the mixed liquid contains alcohols and water.

10. The separating apparatus according to claim 1, further comprising an air separating machine disposed between the discharge side of the atomizing device and the supply side of the collecting device, the air separating machine being partitioned by an air transmitting film into a primary side passage and a secondary side passage, wherein the mixed fluid passes through the primary side passage while air, separated from the mixed fluid by transmission through the air transmitting film, is discharged through the secondary side passage.

11. The separating device according to claim 10, wherein the secondary side passage is in communication with the atomizing device so that the air discharged through the secondary side passage is circulated to the atomizing device.

12. The separating device according to claim 11, wherein the air that is circulated from the secondary side passage to the atomizing device is heated by the outside thermal energy supplying device prior to being supplied to the atomizing device.

13. The separating device according to claim 12, wherein the primary side passage is connected to a collecting chamber for the mixed fluid.

14. The separating device according to claim 10, further comprising a pressurizing device for delivering the mixed fluid to the primary side passage at a high pressure so that a pressure in the primary side passage is higher than a pressure in the secondary side passage.

15. The separating device according to claim 14, wherein the pressurizing device is a compressor.

16. The separating device according to claim 1, wherein the air, that is separated from the mixed fluid in the collecting device, is supplied to the atomizing device.

* * * * *